United States Patent
Shabgard et al.

(10) Patent No.: US 10,702,794 B2
(45) Date of Patent: Jul. 7, 2020

(54) MULTIPLE-EFFECT VAPOR CHAMBER DISTILLATION SYSTEM AND METHODS OF USE

(71) Applicant: The Board of Regents of the University of Oklahoma, Norman, OK (US)

(72) Inventors: Hamidreza Shabgard, Norman, OK (US); Kumar Parthasarathy, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 30 days.

(21) Appl. No.: 16/175,352

(22) Filed: Oct. 30, 2018

(65) Prior Publication Data

US 2019/0126164 A1    May 2, 2019

Related U.S. Application Data

(60) Provisional application No. 62/578,605, filed on Oct. 30, 2017.

(51) Int. Cl.
*B01D 3/14* (2006.01)
*C02F 1/08* (2006.01)
(Continued)

(52) U.S. Cl.
CPC .............. *B01D 3/146* (2013.01); *B01D 1/22* (2013.01); *B01D 3/106* (2013.01); *B01D 5/006* (2013.01);
(Continued)

(58) Field of Classification Search
CPC . B01D 1/22; B01D 1/26; B01D 3/007; B01D 3/106; B01D 3/146; B01D 5/006;
(Continued)

(56) References Cited

U.S. PATENT DOCUMENTS 3,768,539 A * 10/1973 Chamberlin ............. B01D 1/22
                                                            159/13.2
6,635,150 B1 * 10/2003 Le Goff .................. B01D 1/221
                                                            159/13.1
(Continued)

*Primary Examiner* — Renee Robinson
(74) *Attorney, Agent, or Firm* — Dunlap Codding, P.C.

(57) ABSTRACT

A distillation system having a plurality of chambers, an input conduit connected to each chamber to deliver an aqueous fluid to each chamber; a pressure reducing valve connected to the input conduit; a waste output conduit connected to a waste collection compartment of each chamber; and condensate output conduit connected to a condensate collection compartment of each chamber. An evaporation wall of each chamber is constructed to maintain an evaporation surface temperature that is greater than a condensation surface temperature of a condensation wall of each chamber. The aqueous fluid forms a fluid coating, which moves down the evaporation wall. A saturation pressure differential is created as water from the aqueous fluid evaporates from the evaporation wall and condenses on the condensation wall forming an aqueous condensate, which moves down the condensation wall and is collected as an aqueous distillate in the condensate collecting compartment.

22 Claims, 6 Drawing Sheets

(51) Int. Cl.
*C02F 1/04* (2006.01)
*B01D 5/00* (2006.01)
*B01D 1/22* (2006.01)
*B01D 3/10* (2006.01)
*C02F 103/10* (2006.01)
*C02F 103/08* (2006.01)
*C02F 1/14* (2006.01)

(52) U.S. Cl.
CPC ............... *C02F 1/048* (2013.01); *C02F 1/08* (2013.01); *C02F 1/14* (2013.01); *C02F 2103/08* (2013.01); *C02F 2103/10* (2013.01)

(58) Field of Classification Search
CPC .. C02F 1/04; C02F 1/046; C02F 1/048; C02F 1/08
See application file for complete search history.

(56) References Cited

U.S. PATENT DOCUMENTS

| | | | | |
|---|---|---|---|---|
| 2002/0166758 A1* | 11/2002 | Vinz | ........................ | B01D 1/26 |
| | | | | 203/2 |
| 2006/0272933 A1* | 12/2006 | Domen | ................ | B01D 1/0047 |
| | | | | 203/10 |
| 2011/0084025 A1* | 4/2011 | Tominaga | .............. | B01D 5/006 |
| | | | | 210/638 |
| 2016/0288012 A1* | 10/2016 | Zeitoun | .................... | B01D 1/26 |
| 2017/0014773 A1* | 1/2017 | Swaminathan | ........ | B01D 61/36 |

\* cited by examiner

MULTIPLE-EFFECT VAPOR CHAMBER DISTILLATION SYSTEM AND METHODS OF USE

CROSS-REFERENCE TO RELATED APPLICATIONS

This application claims priority to U.S. Provisional Application Ser. No. 62/578,605, filed on Oct. 30, 2017, which is expressly incorporated herein by reference in its entirety.

BACKGROUND

In 2012, $20 \times 10^9$ barrels (bbl) of produced water (referred to herein as production or aqueous fluid) were produced in the oil and gas industry in the United States. Handling produced waste water presents a major challenge for the extraction and production companies. In addition, several states with the highest waste water output suffer from increasingly scarce fresh water resources—aggravating the competition between oil and gas companies and local farmers. Treatment of the waste water produced by oil and gas operations could benefit the agriculture and food production industries in at least two ways: (1) the water requirement of the oil and gas companies could be satisfied without exerting pressure on fresh water sources, and (2) treated produced water could be used for irrigation and livestock use, reuse in oil and gas operations, or other uses.

One factor that hampers treatment of waste water from oil and gas operations is that most production sites are located in remote areas with limited access to electricity. Further, some of the natural gas produced from certain wells might not be economic to refine and transport and thus is burned into the atmosphere. Due to the above considerations, a thermal desalination system that can use waste heat has advantages over current membrane-based systems.

Constructing a desalination plant near a production site might not be economically justified due to the inherently transient quantity of produced water generated by wells. Thus, there is a need for a portable modular thermal desalination system that may be transported for on-site treatment of the produced waste water at an oil and gas operation site. It is to this end that the water distillation/purification/desalinization system of the present disclosure is directed.

BRIEF DESCRIPTION OF THE DRAWINGS

Several embodiments of the present disclosure are hereby illustrated in the appended drawings. It is to be noted however, that the appended drawings only illustrate several embodiments and are therefore not intended to be considered limiting of the scope of the present disclosure.

DETAILED DESCRIPTION

Figure 1:
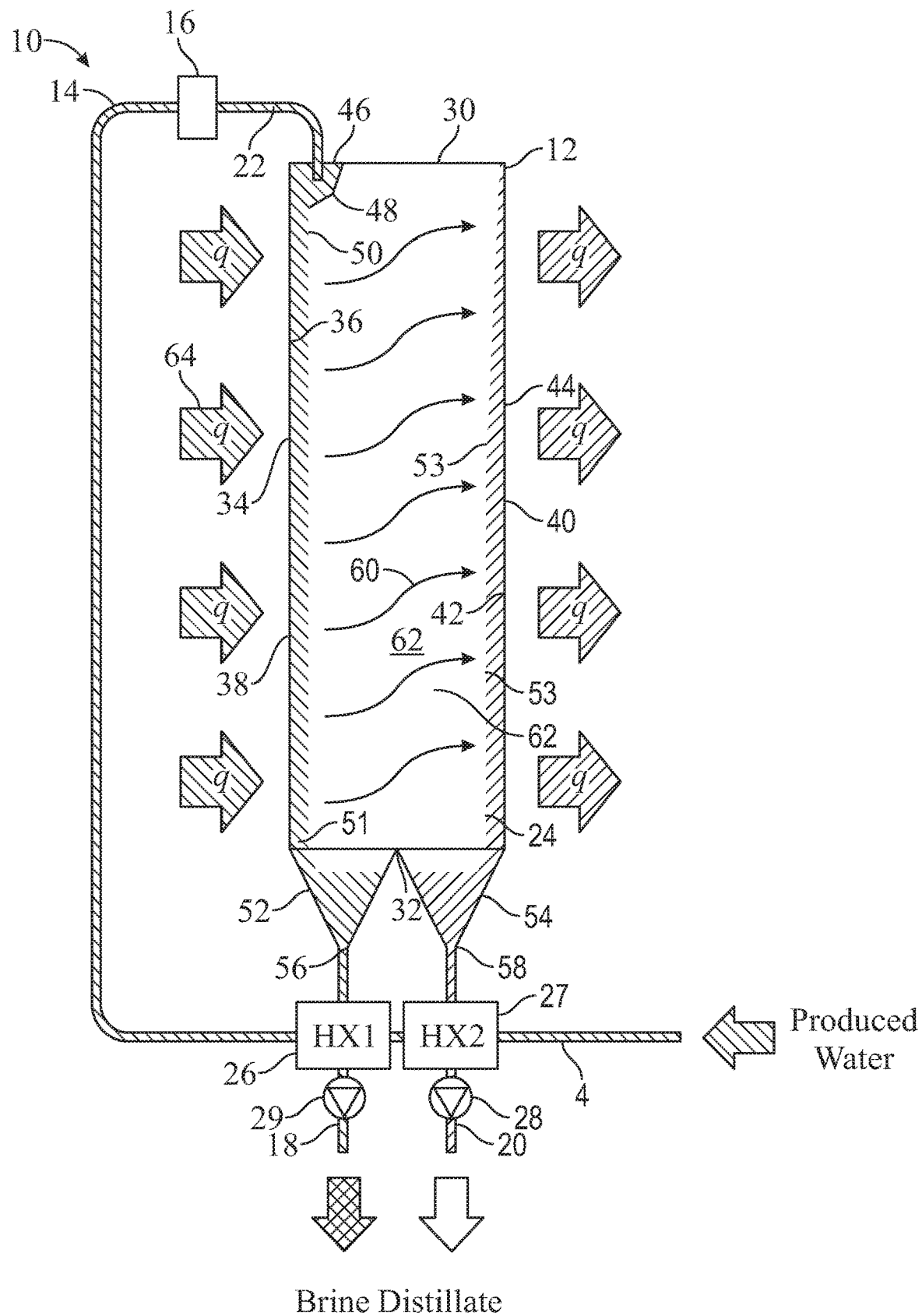
FIG. 1 is a diagrammatic view of an exemplary vapor chamber distillation system according to an embodiment of the present disclosure.

The present disclosure is directed to a novel compact and portable vapor chamber distillation (desalination) system for thermal treatment of production fluid, such as waste water, or other types of water which are desired to be desalinated or otherwise purified. The system offers performance ratios comparable to state-of-the-art commercial desalination plants in a compact, modular, and portable design—which may significantly reduce costs of purification. The vapor chamber distillation system may work with a variety of low grade heat sources available at a production site—such as waste heat and solar energy, for example—to treat the waste water produced at oil and gas operations for beneficial reuse.

Before further describing various embodiments the multiple-effect vapor chamber distillation system of the present disclosure in more detail by way of exemplary description, examples, and results, it is to be understood that the embodiments of the present disclosure are not limited in application to the details as set forth in the following description. The embodiments of the present disclosure are capable of being practiced or carried out in various ways not explicitly described herein. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description. While the present disclosure has been described in terms of particular embodiments, it will be apparent to those of skill in the art that variations may be applied to the apparatus and/or methods and in the steps or in the sequence of steps of the methods described herein without departing from the concept, spirit, and scope of the inventive concepts as described herein. All such similar substitutes and modifications apparent to those having ordinary skill in the art are deemed to be within the spirit and scope of the inventive concepts as disclosed herein.

All patents, published patent applications, and non-patent publications referenced or mentioned in any portion of the present specification are indicative of the level of skill of those skilled in the art to which the present disclosure pertains, and are hereby expressly incorporated by reference in their entirety to the same extent as if the contents of each individual patent or publication was specifically and individually incorporated herein.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

As utilized in accordance with the apparatus, methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the terms "at least one" or "plurality" will be understood to include one as well as any quantity more than one, including but not limited to, 2, 3, 4, 5, 6, 7, 8, 9, 10, 15, 20, 30, 40, 50, 100, or any integer inclusive therein, and/or any range described herein. The terms "at least one" or "plurality" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" and "approximately" are used to indicate that a value includes the inherent variation of error in a parameter. As used herein the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The terms "about" or "approximately", where used herein when referring to a measurable value is also meant to encompass, for example, variations of ±20% or ±10%, or ±5%, or ±1%, or ±0.1% from the specified value. As used herein, the term "substantially" means that the subsequently described event, circumstance or parameter completely occurs or that the subsequently described event, circumstance, or parameter occurs to a great extent or degree. For example, the term "substantially" means that the subsequently described event, circumstance, or parameter occurs at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units (for example where units are Pa) therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure.

Where used herein, the term "waste water" is intended to refer to all types of water that contains solutes that are desired to be removed from the water source, including but not limited to saltwater, wellwater, industrial water, contaminated freshwater, and water produced from oil and gas operations. The terms "waste water" and "produced water" and "production fluid" may be used interchangeably herein.

Where used herein, the term "facial surface" in intended to refer to a surface that faces another surface.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The inventive concepts of the present disclosure will be more readily understood by reference to the following examples and embodiments, which are included merely for purposes of illustration of certain aspects and embodiments thereof, and are not intended to be limitations of the disclosure in any way whatsoever. Those skilled in the art will promptly recognize appropriate variations of the apparatus, compositions, components, procedures and method shown below.

Referring now to FIG. 1, shown therein is a vapor chamber distillation system 10 constructed in accordance with the present disclosure. The vapor chamber distillation system 10 will be referred to hereinafter as the distillation system 10. The distillation system 10 may be used for thermal treatment of a production fluid (e.g., an aqueous fluid), such as waste water, or other types of water which are desired to be desalinated or otherwise purified. For example, but not by way of limitation, the distillation systems of the present disclosure may be used for treating waste water at an oil and gas production site. The distillation system 10 generally includes a chamber 12, an input conduit 14 fluidly connected to the chamber 12, a pressure reducing valve 16 connected to the input conduit 14, a waste output conduit 18 connected to the chamber 12, and a condensate output conduit 20 connected to the chamber 12.

As will be explained in further detail below, a production fluid 22 (an aqueous fluid) may be conveyed through the input conduit 14 and delivered to the chamber 12 where the production fluid 22 is distilled, desalinated, or otherwise purified. An amount of the production fluid 22 exits the waste output conduit 18 and an amount of an aqueous distillate 24 exits the condensate output conduit 20. The distillation system 10 may further include a first heat exchanger 26 located at an intersection between the input conduit 14 and the waste output conduit 18 and a second heat exchanger 27 located between the input conduit 14 and the condensate output conduit 20 for transferring heat from the waste output conduit 18 and aqueous distillate 24, respectively, to the input conduit 14. The distillation system 10 may further include a first pump 28 positioned on the condensate output conduit 20 for discharging the aqueous distillate 24 from the chamber 12 and a second pump 29 positioned on the waste output conduit 18 for discharging an aqueous waste fluid 51 (e.g., brine) from the chamber 12.

The chamber 12 includes a top end 30, a bottom end 32, an evaporation wall 34 having an inner surface 36 and an outer surface 38, and condensation wall 40 positioned opposite (facing) the evaporation wall 34 and having an inner surface 42 and an outer surface 44. The chamber 12 has an internal pressure. The inner surface 36 of the evaporation wall 34 may be referred to as an evaporation surface. The inner surface 42 of the condensation wall 40 may be referred to as a condensation surface. The inner surface 42 of the condensation wall 40 faces the inner surface 36 of the evaporation wall 43.

The chamber 12 further includes an inlet 46 positioned at the top end 30 and a baffle 48 to direct the production fluid 22 from the inlet 46 to the inner surface 36 of the evaporation wall 34 to form a liquid coating 50 on the inner surface 36 of the evaporation wall 34. The chamber 12 also includes a waste collection compartment 52 positioned at the bottom end 32 adjacent to the evaporation wall 34 to receive the aqueous waste fluid 50 formed from the unevaporated production fluid 22 that drains from the evaporation wall 34, and a condensate collection compartment 54 positioned at the bottom end 32 adjacent to the condensation wall 40 to receive the aqueous distillate 24 from the condensation wall 40. The waste collection compartment 52 has a waste outlet 56 at a lower end thereof, and the condensate collecting compartment has a condensate outlet 58 at a lower end thereof.

The input conduit 14 is fluidly connected to the baffle 48 to deliver the production fluid 22 to the chamber 12. The pressure reducing valve 16 is connected to the input conduit 14 and configured to adjust the internal pressure of the chamber 12 proportional to the saturation pressure corresponding to the vapor temperature inside the chamber 12. The waste output conduit 18 is connected to the waste outlet 56 of the waste collection compartment 52 of the chamber 12, and the condensate output conduit 20 is connected to the condensate outlet 58 of the condensate collection compartment 54 of the chamber 12. The pumps 28 and 29 function to isolate the internal pressure of the chamber 12 from the external atmosphere if the internal pressure of the chamber 12 is less than the external atmosphere. If the internal pressure of the chamber 12 is greater than the external atmosphere the pumps 28 and 29 may be replaced with pressure reducing valves. As the skilled artisan will understand, the pumps 28 and 29 have a low pressure side and a high pressure side. When the internal pressure of chamber 12 is less than the external atmosphere the pumps 28 and 29 raise the pressure of the fluid passing through the pumps 28 and 29 such that a first pressure at the discharge side is higher than a second pressure at the suction side.

The inner surface 36 of the evaporation wall 34 is constructed to maintain an evaporation temperature that is greater than a condensation surface temperature of the inner surface 42 of the condensation wall 40 such that when the production fluid 22 is delivered from the input conduit 14 into the chamber 12 and the production fluid 22 forms the liquid coating 50, which moves down and coats the inner surface 42 of the evaporation wall 34 towards the waste collection compartment 52, a saturation pressure differential is created as water from the production fluid 22 evaporates from the inner surface 36 of the evaporation wall 34 and condenses on the inner surface 42 of the condensation wall 40 to form an aqueous condensate 53, which moves down the inner surface 42 of the condensation wall 40 and is collected as the aqueous distillate 24 in the condensation collecting compartment 54. This process may be referred to herein as "filmwise" evaporation.

When the distillation system 10 is in use, air and any other non-condensable gases may be initially purged from within the chamber 12. The production fluid 22 (or aqueous fluid, e.g., waste water) is introduced to the chamber 12 at inlet 46 and is directed by the baffle 48 to form the liquid coating 50 trickling down the inner surface 36 of the evaporation wall 34 of the chamber 12. Simultaneously, a thermal energy source, such as thermal energy 64 "q", may be supplied to the external surface 38 of evaporation wall 34. Due to reduced pressure inside the chamber 12, the liquid coating 50 evaporates by absorbing the supplied heat 64 "q" as the liquid coating 50 trickles down the evaporation wall 34. The heat source 64 may be any heat source known in the art such as, but not limited to, natural gas, low pressure steam from a cogeneration power plant, or solar energy. As a result, a saturated water vapor 60 fills an inner space 62 of the chamber 12 and the internal pressure of the chamber 12 rises. As the pressure increases, the corresponding saturation temperature of the saturated water vapor 60 also increases. As indicated above, the condensation wall 40 opposite to the evaporation wall 34 is maintained at a slightly lower temperature than that of evaporation wall 34. Adjacent to the condensation wall 40, a temperature gradient is formed within the vapor 60 that equals the temperature of the condensation wall 40, on one end, and the saturation vapor temperature corresponding to the internal pressure of the chamber 12, on the other end. As long as the vapor saturation temperature is less than the temperature of the condensation wall 40, the vapor 60 adjacent to the condensation wall 40 may be in a superheated state and will not condense. However, once the saturation vapor temperature surpasses the temperature of condensation wall 40, the vapor 60 adjacent to the condensation wall 40 will become subcooled and condense on the inner surface 42 of the condensation wall 40 forming the aqueous condensate 53, which trickles down the inner surface 42 of the condensation wall 40 forming the aqueous distillate 24.

The portion of the liquid coating 50, which does not evaporate, trickles down the inner surface 36 of the evaporation wall 34 and is collected as an aqueous waste fluid 51 by the waste collection compartment 52. From the waste collection compartment 52, the aqueous waste fluid 51 passes though the waste output conduit 18, which passes through the heat exchanger 26, thereby transferring heat from the waste output conduit 18 to the input conduit 14 and preheating newly supplied production fluid 22 in the input conduit 14. In this way, the distillation system 10 is able to use a "recycled" heat source to heat the newly supplied production fluid 22, in addition to the heat source 64. The aqueous waste fluid 51 then passes from the heat exchanger 26 and is output from the chamber 12 through the waste output conduit 18 (which may transport the waste to a disposal mechanism or may transport the waste to a subsequent chamber for further processing, as described below with reference to FIG. 2).

After the formation of the aqueous condensate 53 on the inner surface 42 of the condensation wall 40, a temperature gradient is established across the thickness of the aqueous condensate 53 with the liquid-vapor interface at the vapor saturation temperature and the wall-liquid interface at a condensation wall temperature. The latent heat released during the condensation of the vapor 60 on the condensation wall 40 leaves the chamber 12 at a temperature equal to that of the condensation wall 40. The aqueous condensate 53 trickles down the inner surface 42 of the condensation wall 40 forming the aqueous distillate 24 which is collected in the condensate collection compartment 54. From the condensate collection compartment 54, the collected aqueous distillate 24 is removed from the distillation system 10 via the condensate output conduit 20 for or another use such as, but not limited to, reuse in the oil and gas extraction or irrigation.

The evaporation wall 34 and the condensation wall 40 may be constructed from any suitable metal or other material which functions in accordance with the requirements of the present disclosure. In general, any high thermal conductivity solid material with an operating temperature range greater than 0° C., has sufficient mechanical strength may be used to construct the evaporation wall 34 and/or the condensation wall 40. Candidate materials include, but are not limited to, metals such as aluminum and aluminum alloys, stainless steel, nickel, and coated iron, and high thermal conductivity ceramics such as alumina and Shapal™ Hi-M Soft, and high thermal conductivity plastics and polymers. In non-limiting embodiments, the evaporation wall 34 and condensation wall 40 thickness may be in a range from about 0.1 mm to about 5 mm. In one embodiment the thickness ranges from about 0.1 mm to about 3 mm, depending on the mechanical strength of the material. A thinner wall may be made from a high thermal coactivity material for beneficial heat transfer.

In non-limiting embodiments, a special coating (e.g., a Teflon material) may be applied to the inner surface 36 of the evaporation wall 34 and/or the inner surface 42 of the condensation wall 40 for reducing deposit formation on the inner surface 36 by creating a non-stick surface. The special coating may also be applied to the inner surface 42 of the condensation wall 40 to promote a special regime of condensation, e.g. dropwise condensation, which may promote heat transfer.

The input conduit 14, the waste output conduit 18, and the condensate output conduit 20 may be comprised of any pipe known in the art for transferring production fluids (e.g., waste water produced by oil and gas operations) and waste fluids and distilled fluids therefrom. The conduits 14, 18, and 20 may be made of any material suitable for conveying a production fluid such as, but not limited to, polymer, rubber, plastic, cast iron, ductile iron, aluminum, copper, brass and silicon and other materials known for corrosion resistant properties. The input conduit 14 may have a diameter between 1 mm and 1000 mm inches (or millimeters). In one embodiment, the diameter of the input conduit 14 is about 20 mm. The waste output conduit 18 may have a diameter between 1 mm and 1000 mm. In one embodiment, the diameter of the waste output conduit 18 is about 20 mm. The condensate input output 20 may have a diameter between 1 mm and 1000 mm. In one embodiment, the diameter of the condensate output conduit is about 20 mm.

The pressure reducing valve 16 connected to the input conduit 14 may be any known pressure reducing valve known in the art suitable for controlling the pressure of fluid flowing through a pipe such as but not limited to pilot-operated or direct-acting pressure reducing valves. One having ordinary skill in the art will appreciate that pressure reducing valves are configured to reduce a higher inlet pressure to a lower downstream pressure, regardless of changing flow rate and/or varying inlet pressure. Such pressure reducing valves are generally formed of a corrosion resistant material such as, but not limited to, brass, plastic, aluminum, and various grades of stainless steel. The preferred material may depend on the operating temperature and the corrosiveness of the fluid being conveyed through the input conduit 14.

The heat exchangers 26 and 27 may be any heat exchanger known in the art for transferring heat from one location to another by transmitting the heat between fluids such as, but not by way of limitation, a plate heat exchanger or shell-and-tube heat exchanger. The heat exchange 26 may be formed from a variety of materials known in the art such as, but not limited to copper, stainless steel, and copper/nickel allow. Other materials may be used in the heat exchanger's device fittings, end bonnets, and heads.

The pump 28 and the pump 29 may be any pump known in the art such as, but not limited to, centrifugal pumps and positive displacement pumps for aiding in the discharge of a fluid from a chamber. The pump 28 is used to equalize the pressure of the aqueous distillate 24 with ambient pressure and discharge the fluid from the chamber 12 if the internal pressure of the chamber is smaller than the external atmosphere. The pump 29 is used to equalize the production or waste fluid (e.g., brine) with ambient pressure and discharge the fluid from the chamber 12 if the internal pressure of the chamber is less than the external atmosphere.

Figures 2, 2A:
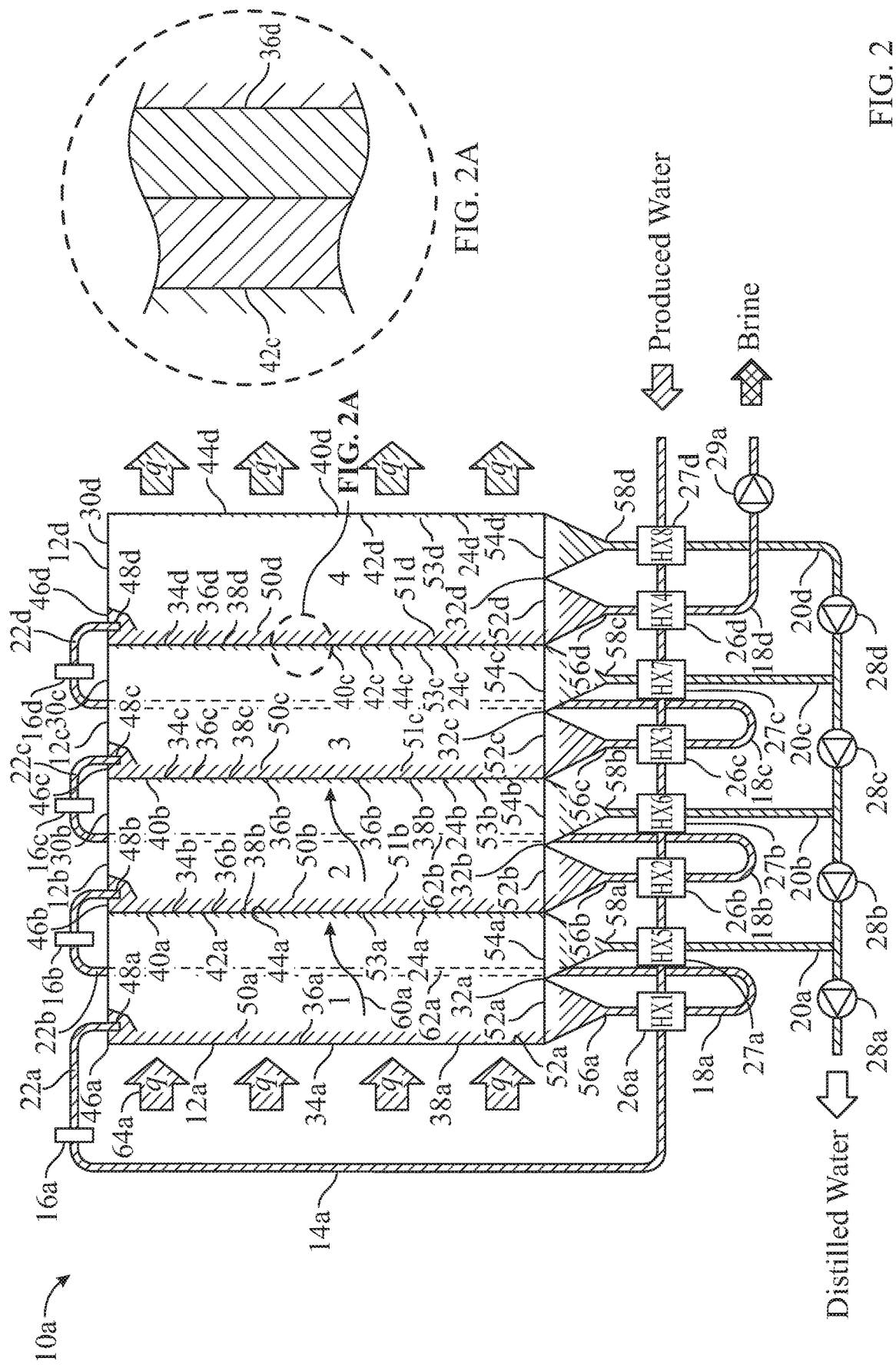
FIG. 2 is a diagrammatic view of another embodiment of a vapor chamber distillation system shown with a plurality of chambers connected in a series.
FIG. 2A is an enlarged diagrammatic view of an embodiment of a portion of a vapor distillation system.

Referring now to FIG. 2, shown therein is another embodiment of a distillation system 10a shown with a plurality of chambers 12 connected in a series. The chambers 12 are labeled in FIG. 2 with the notations 12a, 12b, 12c, and 12d for purposes of clarity. The distillation system 10a includes an input conduit 14a connected to a first chamber 12a, a first transfer conduit 18a extending from the first chamber 12a and connecting to a second chamber 12b, a second transfer conduit 18b extending from the second chamber 12b and connecting to a third chamber 12c, a third transfer conduit 18c extending from the third chamber 12c and connecting to fourth chamber 12d, and a condensate output conduit 18d extending from the fourth chamber 12d. The distillation system also includes a first condensate output conduit 20a extending from the first chamber 12a, a second condensate output conduit 20b extending from the second chamber 12b and connecting to the first condensate output conduit 20a, a third condensate output conduit 20c extending from the third chamber 12c and connecting to the first condensate output conduit 20a, and a fourth condensate output conduit 20d extending from the fourth chamber 12d and connecting to the first condensate output conduit 20a.

As will be explained in further detail below, a production fluid 22a may be conveyed through the input conduit 14a and delivered to the chamber 12a where the production fluid 22a is distilled. An amount of the production fluid 22a exits the transfer conduit 18a and an amount of an aqueous distillate 24a exits the condensate output conduit 20a. The distillation system 10a may further include a plurality of heat exchangers 26a/26b/26c/26d located at a plurality of respective intersections between the input conduit 14a and the transfer output conduits 18a/18b/18c (respectively) and between the input conduit 14a and the waste output conduit 18d for transferring heat from either the transfer conduit 18a/18b/18c or the waste output conduit 18d to the input conduit 14a. The distillation system 10a may also include a plurality of heat exchangers 27a/27b/27c/27d located at a plurality of intersections between the input conduit 14a and the condensate output conduits 20a/20b/20c/20d (respectively) for transferring heat from the distillate flow to the input stream. The distillation system 10 may further include a plurality of pumps 28a/28b/28c/28d positioned on the condensate output conduit 20 for discharging the aqueous distillate 24a (e.g., distilled water) from the chambers 12a/12b/12c/12d. The distillation system may also include a pump 29a positioned on the waste output conduit 18d for expelling an aqueous waste fluid from the fourth chamber 12d.

As will be explained below, each of the first, second, third, and fourth chambers 12a/12b/12c/12d of the distillation system 10a comprise an evaporation wall 34a/34b/34c/34d (respectively) and a condensation wall 34a/34b/34c/34d (respectively). The distillation system 10a may be referred to as a "forward feed" system. In certain embodiments, the opposite side of the condensation wall 34a of one chamber (e.g., chamber 12a) serves as the heat source and evaporation wall 34b of the downstream chamber (i.e., chamber 12b). In certain embodiments, the condensation wall and evaporation wall of adjacent chambers about each other and are connected but do not form a single integral wall between the two chambers. In the high temperature and pressure (input) end (i.e., first chamber 12a) of the cascade of the chambers 12a/12b/12c/12d, the production fluid 22a within chamber 12a is vaporized by a heat source 64a "Q" supplied to the evaporation wall 34a. The temperature at which evaporation occurs depends on the available heat source, such as natural gas, low pressure steam from a cogeneration power plant, electrical heater, or solar energy. An amount of saturated vapor 60a formed by evaporation from the evaporation wall 34a travels across the chamber 12a to the condensation wall 40a of the chamber 12a, where the water vapor is condensed to an aqueous condensate 53a and flows to and out of a bottom end 32a of the chamber 12a as the aqueous distillate 24a. This process also occurs in each of the consecutive chambers 12b, 12c, and 12d.

Now referring to each chamber in more detail, the first chamber 12a has a first internal pressure, a first top end 30a, a first bottom end 32a, a first evaporation wall 34a having an inner surface 36a (or evaporation surface) and an outer surface 38a, a first condensation wall 40a positioned opposite the first evaporation wall 34a and having an inner surface 36a (or condensation surface) and an outer surface 38a, a first inlet 46a positioned at the first top end 30a, a first baffle 48a to direct the production fluid 22a from the first inlet 46a to the inner surface 36a of the first evaporation wall 34a to form a first fluid coating 50a (or liquid coating) on the inner surface 42a of the first evaporation wall 34a, a first waste collection compartment 52a positioned at the first bottom end 32a adjacent to the first evaporation wall 34a to receive the production fluid 22a from the evaporation wall 34a, and a first condensate collection compartment 54a positioned at the first bottom end 32a adjacent to the condensation wall 40a to receive the aqueous distillate 24a from the first condensation wall 40a. The first waste collection compartment 52a has a first waste outlet 56a, and the first condensate collecting compartment 54a has a first condensate outlet 58a.

The inner surface 36a of the evaporation wall 34a is constructed to maintain an evaporation surface temperature that is greater than a condensation surface temperature of the inner surface 42a of the condensation wall 40a. When the production fluid 22a is delivered from the input conduit 14a into the first chamber 12a and the production fluid 22a forms the liquid coating 50a, which moves down the inner surface 42b of the first evaporation wall 34a as a first waste fluid towards the first waste collection compartment 52a, a saturation pressure differential is created as water from the production fluid 22a evaporates from the inner surface 36a of the first evaporation wall 34a and condenses on the inner surface 42a of the first condensation wall 40a to form a first aqueous condensate 53a, which moves down the inner surface 42a of the first condensation wall 40a and is collected as the aqueous distillate 24a in the first condensation collecting compartment 54a.

The second chamber 12b has a second internal pressure, a second top end 30b, a second bottom end 32b, a second evaporation wall 34b having an inner surface 36b (or evaporation surface) and an outer surface 38b, and a second condensation wall 40b positioned opposite the second evaporation wall 34b and having an inner surface 36b and an outer surface 38b. The second evaporation wall 34b is positioned adjacent or integral the first condensation wall 40a of the first chamber 12a. The first condensation surface 42a of the first chamber 12a and the second evaporation surface 36b of the second chamber 12b may comprise (1) facial surfaces of a first common wall shared by the first chamber and the second chamber, or (2) facial surfaces of separate but abutting walls of the first chamber and the second chamber, respectively. For example, as shown in FIG. 2A (for illustrative purposes), a condensation surface 42c of the third chamber 12c and an evaporation surface 36d of the fourth chamber 12d may comprise of separate but abutting walls of the third chamber 12c and the fourth chamber 12d. In this configuration, the two adjacent chambers 12c and 12d may be modular and placed next to each other—allowing the heat form the condensation surface 42c to transfer to the evaporation surface 36d. It should be appreciated that the configuration shown in FIG. 2A may be used for each of the chambers 12a-d. It should also be appreciated that the configuration of the chamber walls is not limited to being shared common walls or abutting walls, but may be configured in any known means suitable in the art for heat transfer.

The second chamber 12b also has a second inlet 46b positioned at the second top end 30b and a second baffle 48b to direct a production fluid 22b (i.e., the first aqueous waste fluid from the first chamber) from the second inlet 46b to the inner surface 36b of the second evaporation wall 34b to form a second fluid coating 50b (or liquid coating) on the inner surface 42b of the second evaporation wall 34b. The second chamber 12b further includes a second waste collection compartment 52b positioned at the second bottom end 32b adjacent to the second evaporation wall 34b to receive a second waste fluid from the second evaporation wall 34b, and a second condensate collection compartment 54b positioned at the second bottom end 32b adjacent to the second condensation wall 40a to receive a second aqueous distillate 24b from the second condensation wall 40b. The second waste collection compartment 52b has a second waste outlet 56b, and the second condensate collecting compartment 54b has a second condensate outlet 58b.

The inner surface 36b of the second evaporation wall 34b is constructed to maintain an evaporation surface temperature that is greater than a condensation surface temperature of the inner surface 42b of the second condensation wall 40b. When the production fluid 22b is delivered from the transfer conduit 18a into the second chamber 12b and the production fluid 22b forms the liquid coating 50b, which moves down the inner surface 42b of the second evaporation wall 34b towards the second waste collection compartment 52b, a saturation pressure differential is created as water from the production fluid 22b evaporates from the inner surface 36b of the second evaporation wall 34b and condenses on the inner surface 42b of the second condensation wall 40b to form a second aqueous condensate 53b, which moves down the inner surface 42b of the second condensation wall 40b and is collected as the aqueous distillate 24b in the second condensation collecting compartment 54b.

The second internal pressure of the second chamber 12b is less than the first internal pressure of the first chamber 12a such that the temperature required for the water to evaporate from the inner surface 36b of the second evaporation wall 34b of the second chamber 12b is less than the temperature required for the water to evaporate from the inner surface 36a of the first evaporation wall 34a of the first chamber 12a.

The third chamber 12c has a third internal pressure, a third top end 30c, a third bottom end 32c, a third evaporation wall 34c having an inner surface (or evaporation surface) 36c and an outer surface 38c, and a third condensation wall 40c positioned opposite the third evaporation wall 34c and having an inner surface (or condensation surface) 36c and an outer surface 38c. The third evaporation wall 34c is positioned adjacent or integral the second condensation wall 40b of the second chamber 12b. The second condensation surface 42b of the second chamber 12b and the third evaporation surface 36c of the third chamber 12c may comprise (1) facial surfaces of a second common wall shared by the second chamber and the third chamber, or (2) facial surfaces of separate but abutting walls of the second chamber and the third chamber, respectively.

The third chamber 12c also has a third inlet 46c positioned at the third top end 30c and a third baffle 48c to direct the production fluid 22c (i.e., the second aqueous waste fluid from the second chamber) from the third inlet 46c to the inner surface 36c of the third evaporation wall 34c to form a third aqueous coating 50c (or liquid coating) on the inner surface 42c of the third evaporation wall 34c. The third chamber 12c further includes a third waste collection compartment 52c positioned at the third bottom end 32c adjacent to the third evaporation wall 34c to receive the production fluid 22c (i.e., a third aqueous waste fluid) from the third evaporation wall 34c, and a third condensate collection compartment 54c positioned at the third bottom end 32c adjacent to the third condensation wall 40c to receive a third aqueous distillate 24c from the third condensation wall 40c. The third waste collection compartment 52c has a third waste outlet 56c, and the third condensate collecting compartment 54c has a third condensate outlet 58c.

The inner surface 36c of the evaporation wall 34c is constructed to maintain an evaporation surface temperature that is greater than a condensation surface temperature of the inner surface 42c of the condensation wall 40c. When the production fluid 22c (i.e., the second aqueous waste fluid from the second chamber) is delivered from the transfer conduit 18b into the third chamber 12c and the production fluid 22c forms the liquid coating 50c, which moves down the inner surface 42c of the evaporation wall 34c towards the waste collection compartment 52c, a saturation pressure differential is created as water from the production fluid 22c evaporates from the inner surface 36c of the third evaporation wall 34c and condenses on the inner surface 42c of the third condensation wall 40c to form a third aqueous condensate 53c, which moves down the inner surface 42c of the third condensation wall 40c and is collected as the aqueous distillate 24c in the third condensation collecting compartment 54c.

The third internal pressure of the third chamber 12c is less than the second internal pressure of the second chamber 12b such that the temperature required for the water to evaporate from the inner surface 36c of the third evaporation wall 34c of the third chamber 12c is less than the temperature required for the water to evaporate from the inner surface 36b of the second evaporation wall 34b of the second chamber 12b.

The fourth chamber 12d has a fourth internal pressure, a fourth top end 30d, a fourth bottom end 32d, a fourth evaporation wall 34d having an inner surface (or evaporation surface) 36d and an outer surface 38d, and a fourth condensation wall 40d positioned opposite the fourth evaporation wall 34d and having an inner surface (or condensation surface) 36d and an outer surface 38d. The fourth evaporation wall 34d is positioned adjacent or integral the third condensation wall 40c of the third chamber 12c. The third condensation surface 42c of the third chamber 12c and the fourth evaporation surface 36d of the fourth chamber 12d may comprise (1) facial surfaces of a third common wall shared by the third chamber and the second chamber, or (2) facial surfaces of separate but abutting walls of the third chamber and the fourth chamber, respectively.

The fourth chamber 12d also has a fourth inlet 46d positioned at the fourth top end 30d and a fourth baffle 48d to direct the production fluid 22d (i.e., the third aqueous waste fluid from the third chamber) from the fourth inlet 46d to the inner surface 36d of the fourth evaporation wall 34d to form a fourth aqueous coating 50d (or liquid coating) on the inner surface 42d of the fourth evaporation wall 34d. The fourth chamber 12d further includes a fourth waste collection compartment 52d positioned at the fourth bottom end 32d adjacent to the fourth evaporation wall 34d to receive the production fluid 22d (a fourth aqueous waste fluid) from the fourth evaporation wall 34d, and a fourth condensate collection compartment 54d positioned at the fourth bottom end 32d adjacent to the condensation wall 40d to receive a fourth aqueous distillate 24d from the fourth condensation wall 40d. The fourth waste collection compartment 52d has a fourth waste outlet 56d, and the fourth condensate collecting compartment 54d has a fourth condensate outlet 58d.

The inner surface 36d of the fourth evaporation wall 34d is constructed to maintain an evaporation surface temperature that is greater than condensation surface temperature of the inner surface 42d of the fourth condensation wall 40d. When the production fluid 22d (i.e., the third aqueous waste fluid) is delivered from the transfer conduit 18c into the fourth chamber 12d and the production fluid 22d forms the liquid coating 50d, which moves down the inner surface 42d of the fourth evaporation wall 34d towards the waste collection compartment 52d, a saturation pressure differential is created as water from the production fluid 22d evaporates from the inner surface 36d of the fourth evaporation wall 34d and condenses on the inner surface 42d of the condensation wall 40d to form a fourth aqueous condensate 53d, which moves down the inner surface 42d of the fourth condensation wall 40d as the fourth aqueous distillate 24d and is collected as the aqueous distillate 24d in the fourth condensation collecting compartment 54d.

The fourth internal pressure of the fourth chamber 12d is less than the third internal pressure of the third chamber 12c such that the temperature required for the water to evaporate from the inner surface 36d of the fourth evaporation wall 34d of the fourth chamber 12d is less than the temperature required for the water to evaporate from the inner surface 36c of the third evaporation wall 34c of the third chamber 12c.

As mentioned above, the first, second, third, and fourth chambers 12a/12b/12c/12d may be formed substantially the same as the chamber 12 described above with reference to FIG. 1. Likewise, the conduits 14a, 18a, 18b, 18c, 18d, and 20a may be made of substantially the same materials as the conduits 14, 18, and 20 described above in reference to FIG. 1. The pressure reducing valves 16a/16b/16c/16d may also be constructed substantially the same as the pressure reducing valve 16 described with reference to FIG. 1. Further, the heat exchangers 26a/26b/26c/26d and 27a/27b/27c/27d may be constructed substantially similar to the heat exchangers 26 and 37 described with reference to FIG. 1. Finally, the pumps 28a/28b/28c/28d and 29a may be constructed substantially similar to the pumps 28 and 29 described above with reference to FIG. 1.

The non-evaporated portion of the input production fluid 22a-d (e.g., aqueous fluids) is introduced to the next downstream vapor chamber (e.g., from the chamber 12a to the chamber 12b). As noted, each of the evaporation walls 34a/34/b/34c/34d forms a corresponding evaporating film sections (aqueous coatings 50a/50b/50c/50d, respectively), and each of the condensation walls 40a/40b/40c/40d form corresponding condensing film sections (aqueous condensates 53a/53b/53c/53d, respectively).

Before entering the second chamber 12b, the temperature of the saturated production fluid 22b may be reduced, for example by about 2° C., by heat transfer from the transfer conduit 18a to the main input conduit 14a through the heat exchanger 26a. The temperature reduction of the production fluid 22b entering the second chamber 12b creates a temperature differential necessary for heat transfer between the condensing steam on the inner surface 42a of the condensation wall 40a of the upstream first chamber 12a and the liquid coating 50b on the inner surface 36b of the evaporation wall 34b in the downstream second chamber 12b. The pressure of the production fluid 22b entering the chamber 12b may also be reduced using the valve 16b. This may allow for evaporation at a lower temperature inside the second chamber 12b relative to the previous first chamber 12a. The process may repeat as the production fluid 22b-d moves throughout each consecutive chamber 12b/12c/12d.

Inside the chamber 12b, the falling liquid coating 50b on the inner surface 36b of the evaporation wall 34b (the common wall separating chambers 12a and 12b) absorbs the heat of condensation generated by the condensing vapor in chamber 12a. As a result, condensation and evaporation occur simultaneously on the two surfaces (i.e., condensation on the inner surface 42a of the condensation wall 40a and evaporation on the inner surface 36a of the evaporation wall 34a) of the wall separating chambers 12a and 12b at slightly different temperatures and pressures. The aqueous distillate 24a from chamber 12a is discharged via the condensate output 20a after its pressure is equalized with the ambient via the pump 28a and the saturated vapor created in the second chamber 12b moves to the condenser section (the inner surface 42b of the second condensation wall 40b). The sensible heat content of the aqueous distillate 24b formed therein may also be recovered before discharging by heat transfer via the heat exchanger 26b to the main input conduit 14a. Similar to the first stage described above, the non-vaporized liquid waste water or production fluid 24b from the second chamber 12b flows through the transfer conduit 18b before entering the third chamber 12c and trickling down the inner surface 36c of the evaporation wall 34c of the third chamber 12c.

For each of the chambers 12a/12b/12c/12d, the lower temperature at the inner surface 42a/42b/42c/42d of the condensation wall 40a/40b/40c/40d compared to the higher temperature at the inner surface 36a/36b/36c/36d of the evaporation wall 34a/34b/34c/34d creates a saturation pressure differential that drives the vapor from the inner surface 36a/36b/36c/36d of the evaporation wall 34a/34b/34c/34d to the inner surface 42a/42b/42c/42d of the condensation wall 40a/40b/40c/40d. The same evaporation/condensation configuration is repeated in the distillation system 10a until the generated saturated vapor temperature reaches a temperature relatively close to a cooling medium, i.e. ambient air or the waste water. The concentration of waste retained in the production fluid (e.g., brine) being transferred downstream chamber to chamber increases as the production fluid 22 moves from one chamber to another chamber. The high concentration waste (or brine) from the last and fourth chamber 12d is discharged after its pressure is raised to the atmospheric pressure using the pump 29a. Although the distillation system 10a is described as having four chambers 12a-d, it should be understood that the distillation system 10a may have more or less of the chambers.

Figure 3:
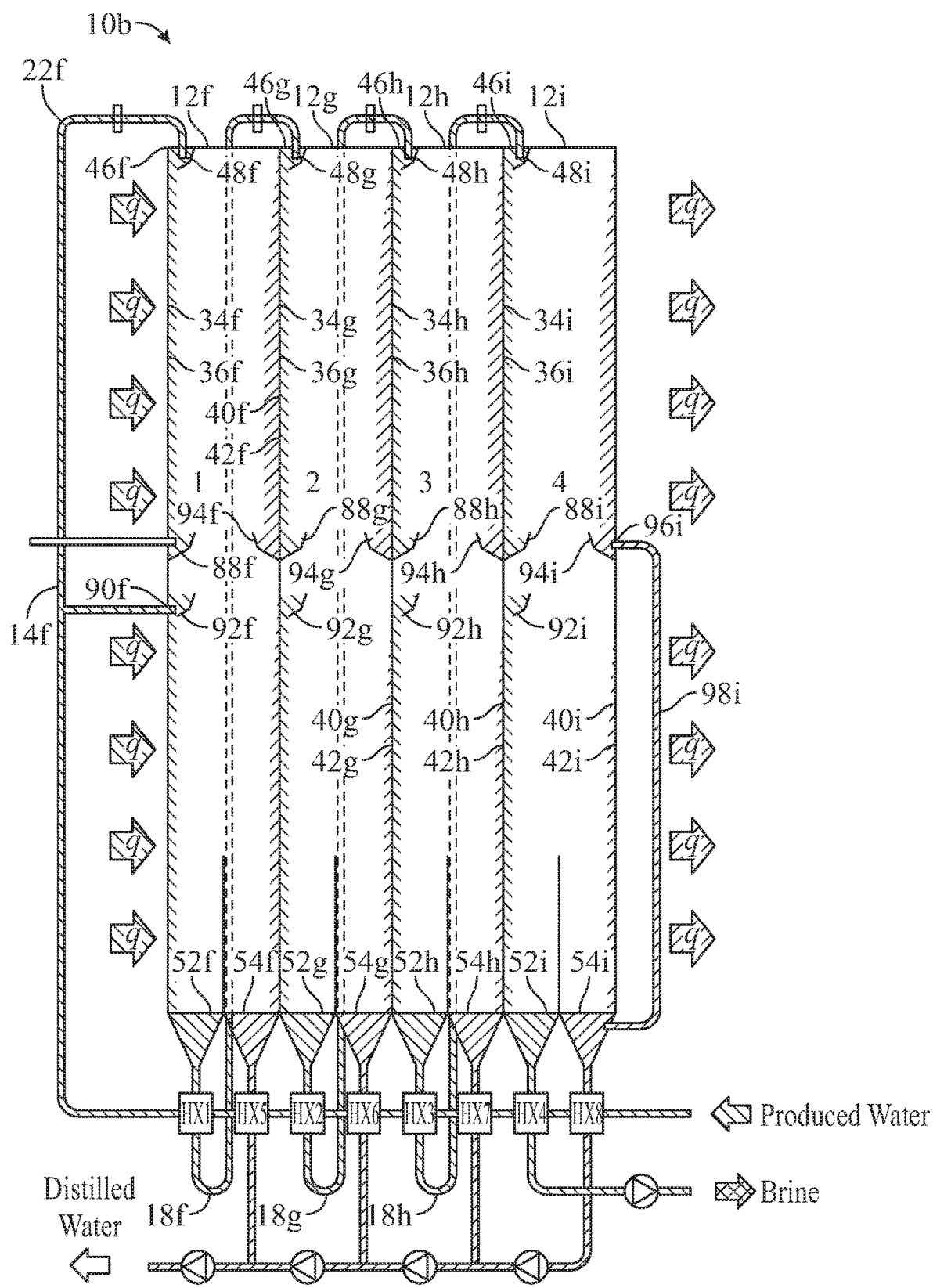
FIG. 3 is a diagrammatic view of yet another embodiment of a vapor chamber distillation system constructed in accordance with the present disclosure.
Figure 4A:
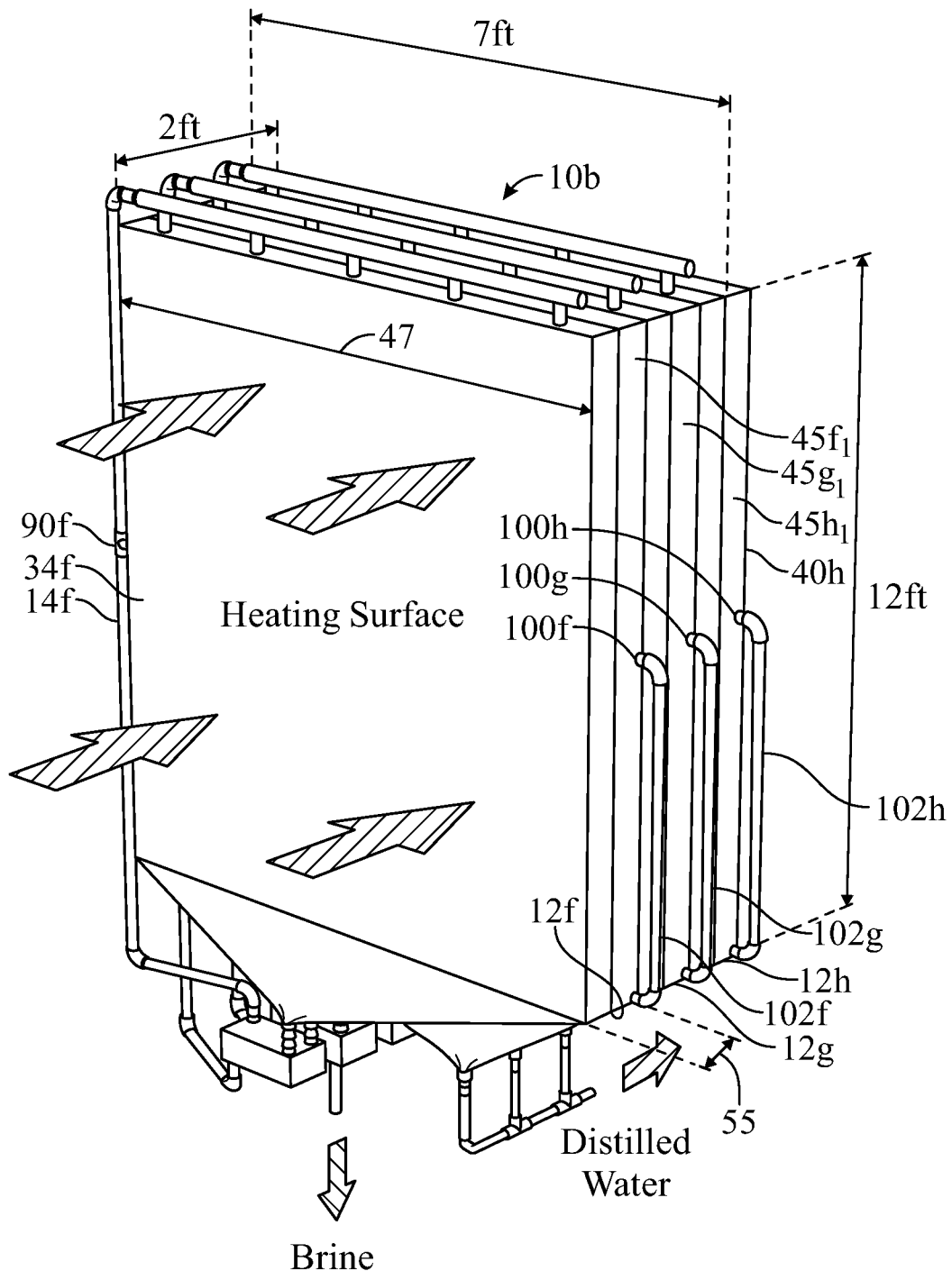
FIG. 4A is a front perspective view of an exemplary embodiment of the vapor chamber distillation system of FIG. 4.
Figure 4B:
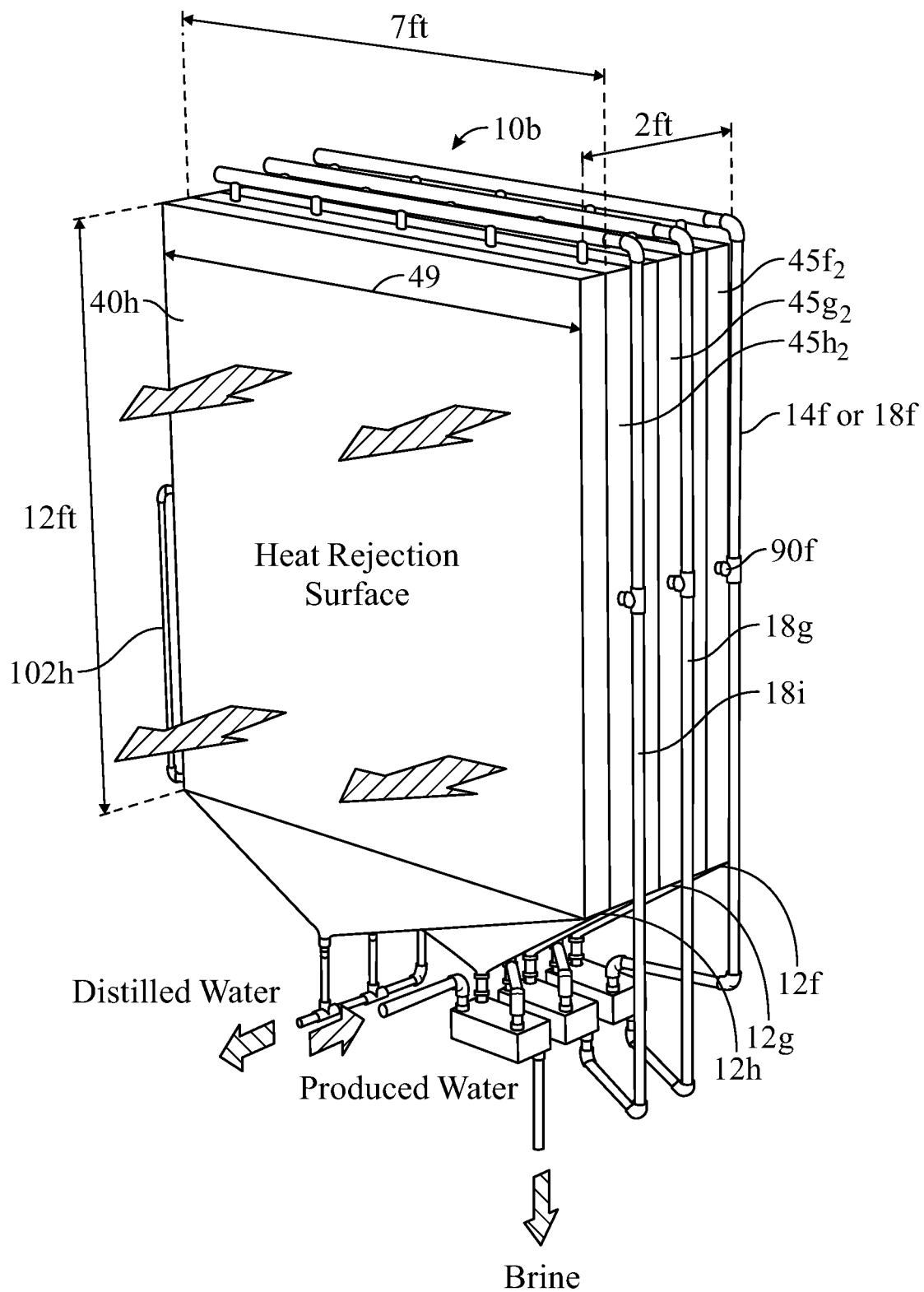
FIG. 4B is a rear perspective view of the vapor chamber distillation system of FIG. 4A.

FIGS. 3, 4A, and 4B show another embodiment of a distillation system, referred to as distillation system 10b. Distillation system 10b is constructed substantially similar to distillation system 10a, except that each of a first, second, third, and fourth chambers 12f/12g/12h/12i includes a plurality of input portals and baffles (described below) on each of the walls of the chambers for shortening the flow length of the fluid films on the evaporation walls 34f/34g/34h/34i and condensation walls 40f/40g/40h/40i. The distillation system 10b shown in FIGS. 4A and 4B is also provided with edge walls $45f_{1-2}/45g_2/45h_{1-2}$. The edge walls $45f_1$ and $45f_2$ connect the evaporation wall 34f to the condensation wall 40f. The edge walls $45g_1$ and $45g_2$ connect the evaporation wall 34g to the condensation wall 40g. The edge walls $45h_1$ and $45h_2$ connect the evaporation wall 34h to the condensation wall 40h. As shown in FIGS. 4A and 4B, the evaporation walls 34f/34g/34h have an evaporation wall width 47, the condensation walls 40f/40g/40h have a condensation wall width 49, and the edge walls $45f_{1-2}/45g_{1-2}/45h_{1-2}$ have an edge wall width 55. The evaporation wall width 47 is greater than the edge wall width 55. This configuration may improve the efficiency of the overall distillation process in the apparatus. This design may increase the distillation capacity of the system, while keeping the height of the respective individual film sections within an efficient range (for example, the efficiency of the filmwise evaporation/condensation may be adversely affected by the film thickness).

For example, as shown in FIG. 3, the chamber 12$f$ includes a first inlet 46$f$ adjacent to a first baffle 48$f$, as well as a second baffle 88$f$ positioned on an inner surface 36$f$ of a first evaporation wall 34$f$ of the first chamber 12$f$. The second baffle 88$f$ is positioned below the first baffle. A third baffle 92$f$ is positioned on the first evaporation wall 34$f$ adjacent to a second inlet 90$f$. An input conduit 14$f$ connects to the first inlet 46$f$ and to the second inlet 90$f$ for delivering a production fluid into the first chamber 12$f$ via the first baffle 48$f$ and the third baffle 92$f$, respectively. The first chamber 12$f$ further includes a collection outlet (not shown) adjacent to the second baffle 88$f$. A collection conduit (not shown) is connected to the collection outlet to transfer fluid collected by the second baffle 88$f$ from the first chamber 12$f$ and transferred to the waste collection 52$f$. The first chamber 12$f$ further includes a first transfer (such as an outlet 100$f$ shown in FIG. 4A) adjacent the fourth baffle 94$f$. A transfer conduit (such as a transfer conduit 102$f$ shown in FIG. 4A) is connected to the transfer outlet of the first chamber 12$f$ for conveying aqueous distillate from the inner surface 42$f$ of the condensation wall 40$f$ to a condensate collection compartment 54$f$.

The second chamber 12$g$ includes an inlet 46$g$ adjacent to a first baffle 48$g$. The first baffle 48$g$ receives a production fluid from a transfer conduit 18$f$ extending from the first chamber 12$f$. The second chamber 12$g$ also includes a second baffle 88$g$ positioned on an inner surface 36$g$ of an evaporation wall 34$g$ of the second chamber 12$g$ below the first baffle 48$g$. The second baffle 88$g$ is adjacent to a collection outlet (not shown). A collection conduit (not shown) is connected to the collection outlet to transfer fluid collected by the second baffle 88$g$ from the second chamber 12$g$ and transferred to the waste collection compartment 52$gg$. The second chamber 12$g$ includes a third baffle 92$g$ positioned below the second baffle 88$g$ and on the inner surface 36$g$ of the evaporation wall 34$g$. The third baffle 92$g$ is adjacent to an inlet (not shown). A small pipe connects from the transfer 18$f$ to the inlet of the third baffle 92$g$. The second chamber 12$g$ further includes a fourth baffle 94$g$ positioned on an inner surface 42$g$ of a condensation wall 40$g$ of the second chamber 12$g$. The fourth baffle 94$g$ is adjacent to a transfer outlet (such as a transfer outlet 100$g$ shown in FIG. 4A). A transfer conduit (such as a transfer conduit 102$g$ shown in FIG. 4A) is connected to the transfer outlet 100$g$ of the second chamber 12$g$ for conveying aqueous distillate from the inner surface 42$g$ of the condensation wall 40$g$ to a condensate collection compartment 54$g$ (shown in FIG. 3).

The third chamber 12$h$ includes an inlet 46$h$ adjacent to a first baffle 48$h$. The first baffle 48$h$ receives the production fluid from a transfer conduit 18$g$ extending from the second chamber 12$g$ and connected to the inlet 46$h$ of the third chamber 12$h$. The third chamber also includes a second baffle 88$h$ positioned on an inner surface 36$h$ of an evaporation wall 34$h$ of the third chamber 12$h$. The second baffle 88$h$ is adjacent to a collection outlet (not shown). A collection conduit (not shown) is connected to the collection outlet to transfer fluid collected by the second baffle 88$h$ from the third chamber 12$h$ to the third waste collection compartment 52$h$. The third chamber 12$h$ also includes a third baffle 92$h$ positioned below the second baffle 88$h$ and on the inner surface 36$h$ of the evaporation wall 34$h$. The third baffle 92$h$ is adjacent to an inlet (not shown). A small pipe connects from the transfer 18$g$ to the inlet of the third baffle 92$g$. The third chamber 12$h$ further includes a fourth baffle 94$h$ positioned on an inner surface 42$h$ of a condensation wall 40$h$ of the third chamber 12$h$. The fourth baffle 94$h$ is adjacent to a transfer (such as a transfer outlet 100 $h$ shown in FIG. 4A). A transfer conduit (such as a transfer conduit 102$h$ shown in FIG. 4A) connects to the transfer outlet 100$h$ of the third chamber 12$h$ for conveying aqueous distillate from the inner surface 42$h$ of the condensation wall 40$h$ to a condensate collection compartment 54$h$ (shown in FIG. 4).

The fourth chamber 12$i$ includes an inlet 46$i$ adjacent to a first baffle 48$i$. The first baffle 48$h$ receives the production fluid from a transfer conduit 18$h$ extending from the third chamber 12$h$ and connected to the inlet 46$i$ of the fourth chamber 12$i$. The fourth chamber also includes second baffle 88$i$ positioned on an inner surface 36$i$ of an evaporation wall 34$i$ and located below the first baffle 48$i$. The second baffle 88$i$ is adjacent to a collection outlet (not shown). A collection conduit (not shown) is connected to the collection outlet to transfer fluid collected by the second baffle 88$i$ from the fourth chamber 12$i$ to the fourth waste collection compartment 52$i$. The fourth chamber 12$i$ further includes a third baffle 92$i$ on the inner surface 36$i$ of the evaporation wall 34$i$ and below the second baffle 88$i$. A small pipe connects from the transfer 18$h$ to the inlet of the third baffle 92$i$. The fourth chamber 12$i$ also includes a fourth baffle 94$i$ on an inner surface 42$i$ of a condensation wall 40$i$. The fourth baffle 94$i$ is adjacent to an outlet 96$i$. The outlet 96$i$ is connected to a transfer conduit 98$i$, which connects to a condensate collection compartment 54$i$.

The distillation system 10$b$ also includes valves, heat exchangers, and pumps, which are located in substantially similar positions, function substantially similar to, and are constructed of substantially the same materials and sizes as the valves, heat exchangers, and pumps of distillation system 10$a$.

The disclosed distillation systems 10/10$a$/10$b$ may significantly reduce piping requirements and provide a compact design that may significantly reduce costs and allow for fabrication of high performance simple, portable desalination and distillation systems than can work with a variety of low grade heat sources including waste heat, natural gas, geothermal heat, and solar energy. Moreover, since the majority of vaporization occurs at the interface of the liquid coating and the saturated vapor of each chamber 12, salt deposition problems on the evaporation walls and maintenance needs may be minimized. In at least certain embodiments, the pumping requirements may be minimal per barrel of distilled fluid or water. For example, in one non-limiting embodiment, pumping power is about 0.004 kWhe (kilowatt hours electric) per barrel of distilled water, which at an electricity price of $0.12/kWhe, provides a pumping cost of less than $0.001 per barrel.

Figure 5:
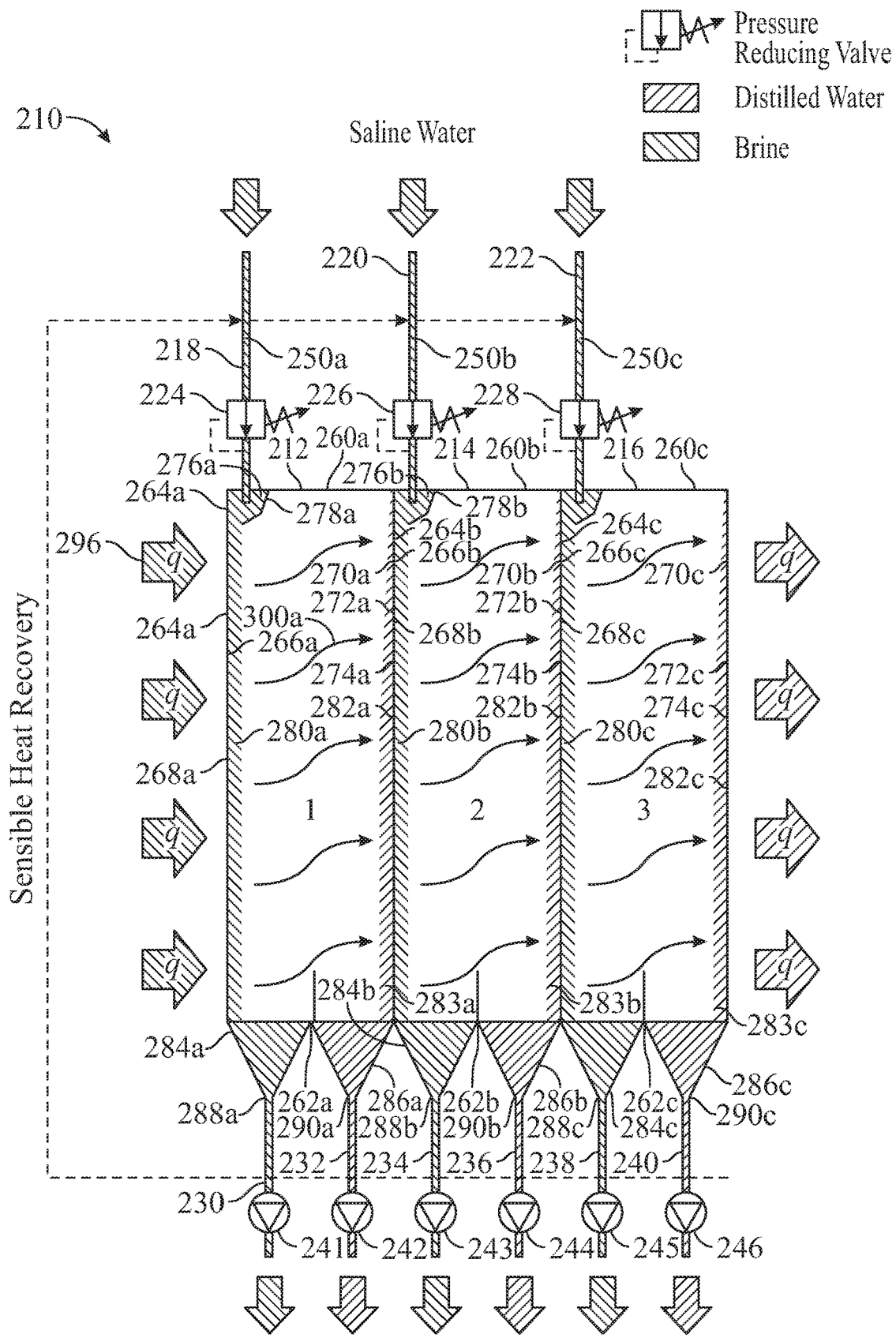
FIG. 5 is another embodiment of a vapor chamber distillation system constructed in accordance with the present disclosure.

Now referring to FIG. 5, shown therein is another embodiment of a distillation system 210. The distillation system 210 may be referred to as a "parallel feed" system. The distillation system 210 includes a first chamber 212, a second chamber 214 adjacent the first chamber 212, and a third chamber 216 adjacent the second chamber 214. The distillation system 210 also includes a first input conduit 218 connected to the first chamber 212, a second input conduit 220 connected to the second chamber 214, and a third input conduit 222 connected to the third chamber 216. The distillation system 210 may further include a first pressure reducing valve 224 positioned on the first input conduit 218 to control the pressure of a production fluid 250 being conveyed into the first chamber 212; a second pressure reducing valve 225 positioned on the second input conduit 220 to control pressure of the production fluid 250 being conveyed into the second chamber 214; and third pressure reducing valve 228 positioned on the third input conduit 222 to control pressure of the production fluid 250 being conveyed into the third chamber 216. Before entering each of the chambers 212, 214, and 216, the production fluid goes through one of the pressure reducing valves 224, 226, or 228 to reach pressure equilibrium with the respective chamber.

The distillation system also includes a first waste output conduit 230 connected to the first chamber 212, a first condensate output conduit 232 connected to the first chamber 212, a second waste put outlet 234 connected to the second chamber 214, a second condensate output conduit 236 connected to the second chamber 214, a third waste put outlet 238 connected to the third chamber 216, a third condensate output conduit 240 connected to the third chamber 212. A first pump 242 may be positioned on the first condensate output conduit 232 for discharging an aqueous distillate from the first chamber 212. A second pump 244 may be positioned on the second condensate output conduit 236 for discharging an aqueous distillate from the second chamber 214. A third pump 246 may be positioned on the third condensate output conduit 240 for discharging an aqueous distillate from the third chamber 216.

The first chamber 212 includes a first internal pressure, a first top end 260a, a first bottom end 262a, an first evaporation wall 264a having an inner surface 266a and an outer surface 268a, and a first condensation wall 270a positioned opposite the evaporation wall 264a and having an inner surface 272a and an outer surface 274a. The first chamber 212 further includes a first inlet 276a positioned at the first top end 260a and a first baffle 278a to direct the production fluid 250a from the first inlet 276a to the inner surface 266a of the first evaporation wall 264a to form a first liquid coating 280a on the inner surface 266a of the evaporation wall 264a. The first chamber 212 also includes a first waste collection compartment 284a positioned at the first bottom end 262a adjacent to the first evaporation wall 264a to receive the production fluid 250a from the first evaporation wall 264a and a first condensate collection compartment 286a positioned at the first bottom end 262a adjacent to the first condensation wall 270a to receive an aqueous distillate 283a from the first condensation wall 270a. The first waste collection compartment 284a has a first waste outlet 288a, and the first condensate collection compartment 286a has a first condensate outlet 290a.

The inner surface 266a of the first evaporation wall 264a is constructed to maintain an evaporation surface temperature that is greater than a condensation surface temperature of the inner surface 272a of the first condensation wall 270a such that when the production fluid 250a is delivered from the second input conduit 220 into the first chamber 212 and the production fluid 250a forms the fluid coating 280a, which moves down the inner surface 266b of the first evaporation wall 264a towards the second waste collection compartment 284a, a saturation pressure differential is created as water from the production fluid 250a evaporates from the inner surface 266a of the first evaporation wall 264a and condenses on the inner surface 272a of the first condensation wall 270a to form an aqueous condensate 282a, which moves down the inner surface 272a of the first condensation wall 270a and is collected as the aqueous distillate 283a in the first condensation collecting compartment 286a.

The second chamber 214 includes a second internal pressure, a second top end 260b, a second bottom end 262b, an second evaporation wall 264b having an inner surface 266b and an outer surface 268b, and a second condensation wall 270b positioned opposite the evaporation wall 264b and having an inner surface 272b and an outer surface 274b. The second chamber 212 further includes a second inlet 276b positioned at the second top end 260b and a second baffle 278b to direct the production fluid 250 from the second inlet 276b to the inner surface 266b of the second evaporation wall 264b to form a second liquid coating 280b on the inner surface 266a of the evaporation wall 264b. The second chamber 214 also includes a second waste collection compartment 284b positioned at the first bottom end 262b adjacent to the second evaporation wall 264b to receive the production fluid 250b from the second evaporation wall 264b and a second condensate collection compartment 286b positioned at the second bottom end 262b adjacent to the second condensation wall 270b to receive an aqueous distillate 283b from the second condensation wall 270b. The second waste collection compartment 284b has a second waste outlet 288a, and the second condensate collection compartment 286b has a second condensate outlet 290b.

The inner surface 266b of the second evaporation wall 264b is constructed to maintain an evaporation surface temperature that is greater than a condensation surface temperature of the inner surface 272b of the second condensation wall 270b such that when the production fluid 250b is delivered from the second input conduit 220 into the second chamber 214 and the production fluid 250b forms the fluid coating 280b, which moves down the inner surface 266b of the second evaporation wall 264b towards the second waste collection compartment 284b, a saturation pressure differential is created as the water from the production fluid 250b evaporates from the inner surface 266b of the second evaporation wall 264b and condenses on the inner surface 272b of the second condensation wall 270b to form a aqueous condensate 282b, which moves down the inner surface 272b of the second condensation wall 270b and is collected as the aqueous distillate 283b in the second condensation collecting compartment 286b.

The second internal pressure of the second chamber 214 is less than the first internal pressure of the first chamber 212 such that the temperature required for the water to evaporate from the inner surface 266b of the second evaporation wall 264b of the second chamber 214 is less than the temperature required for the water to evaporate from the inner surface 266a of the first evaporation wall 264a of the first chamber 212.

The third chamber 214 includes a third internal pressure, a third top end 260c, a third bottom end 262c, a third evaporation wall 264c having an inner surface 266c and an outer surface 268c, and a third condensation wall 270c positioned opposite the evaporation wall 264c and having an inner surface 272c and an outer surface 274c. The third chamber 214 further includes a third inlet 276c positioned at the third top end 260c and a third baffle 278c to direct the production fluid 250 from the third inlet 276c to the inner surface 266c of the third evaporation wall 264c to form a third liquid coating 280c on the inner surface 266c of the evaporation wall 264c. The third chamber 214 also includes a third waste collection compartment 284c positioned at the third bottom end 262c adjacent to the third evaporation wall 264c to receive the production fluid 250 from the third evaporation wall 264c and a third condensate collection compartment 286c positioned at the third bottom end 262c adjacent to the third condensation wall 270c to receive an aqueous distillate 283b from the third condensation wall 270c. The third waste collection compartment 284c has a third waste outlet 288c, and the third condensate collection compartment 286c has a third condensate outlet 290c.

The inner surface 266c of the third evaporation wall 264c is constructed to maintain an evaporation surface temperature that is greater than a condensation surface temperature of the inner surface 272c of the third condensation wall 270c. When the production fluid 250c is delivered from the third input conduit 222 into the third chamber 216 and the production fluid 250c forms the liquid coating 280c, which moves down the inner surface 266c of the third evaporation wall 264c towards the third waste collection compartment 284c, a saturation pressure differential is created as water from the production fluid 250c evaporates from the inner surface 266c of the evaporation wall 264c and condenses on the inner surface 272c of the third condensation wall 270c to form a aqueous condensate 282c, which moves down the inner surface 272c of the third condensation wall 270c and is collected as the aqueous distillate 283c in the condensation collecting compartment 286c.

The third internal pressure of the third chamber 216 is less than the second internal pressure of the second chamber 214 such that the temperature required for the water to evaporate from the inner surface 266c of the third evaporation wall 264c of the third chamber 216 is less than the temperature required for the water to evaporate from the inner surface 266b of the second evaporation wall 264b of the second chamber 214.

The first, second, and third chambers 212/214/216 may be formed substantially the same as the chamber 12 described above with reference to FIG. 1. Likewise, the conduits 218, 220, 222, 230, 232, 234, 238, and 240 may be made of substantially the same materials as the conduits 14, 18, and 20 described above in reference to FIG. 1. The pressure reducing valves 224, 226, and 228 may also be constructed substantially the same as the pressure reducing valve 16 described with reference to FIG. 1. Further, distillation system 210 may be equipped with heat exchangers constructed substantially similar the heat exchangers 26 and 27 described with reference to FIG. 1. Finally, the pumps 241, 242, 243, 244, 245 and 246 may be constructed substantially similar to the pumps 28 and 29 described above with reference to FIG. 1.

The distillation system 210 functions substantially similar to the distillation system 10a except that with the distillation system 210—each chamber 212, 214, and 216 connects to a separate input conduit, namely input conduits 218, 220, and 222, respectively. This may increase heat efficiency by reducing thermal resistance. In the disclosure described with reference to distillation system 10a, the production fluid increases in thickness each time it enters a subsequent chamber-having been distilled in the previous chamber. By providing a separate input conduit conveying production fluid to each chamber 212, 214, and 216, the production fluid does not increase in thickness.

As shown in FIG. 5, the distillation system 210 is comprised of a series of the chambers 212, 214, and 216, in which the condenser section (i.e., the condensation walls 210a/270b/) of the upstream vapor chamber serves as the heat source for the evaporator section (i.e., the evaporation walls 264b/264b) of the downstream chamber. In one embodiment, the vapor chambers 212, 214, and 216 may be vertically-oriented shallow steel boxes where the two large vertical faces serve as the evaporator and condenser walls and other faces are adiabatic. A production fluid, such as saline water, enters the vapor chambers 212, 214, and 216 in parallel feed arrangement; that is each chamber 212, 214, and 216 is directly connected to the production fluid (e.g., saline water) source.

In the high temperature end (i.e., chamber 212) of the distillation system 210 or cascade, the production fluid 250a or feed water is evaporated by a heat source, such as heat source 296 "q", which is supplied heat through the first evaporator wall 264a. Similar to distillation systems 10/10a/10b, a variety of heat sources may be used including, but not limited to, natural gas, low pressure steam from a cogeneration power plant, or solar energy. An amount of saturated vapor 300a then travels to the inner surface 272a of the first condensation wall 270a of the first chamber 212. The first condensation wall 270a has a temperature that is lower than the temperature of the first evaporation wall 264a. The saturated vapor 300a condenses on the relatively colder first condensation wall 270a. The aqueous distillate (or distilled water) 283a is collected at the bottom of the chamber 212 and is discharged through the first condensate output 232 after its pressure is brought to equilibrium with the ambient via the pump 242. Similarly, the non-evaporated portion of the production fluid 250a-c (or aqueous fluid or feed water) is discharged through the first waste output conduit 230 after its pressure is increased to the atmospheric value. This process also occurs in the second and third chambers 214 and 216. The thermal energy content of the discharging waste (or brine) and the aqueous distillate may be recovered to preheat the production fluid. For example, the pathway of the first input conduit 218 may be altered to pass through a first heat exchanger located at an intersection between the first waste output conduit 230 and second heat exchanger located at an intersection between the first input conduit 218 and the first condensate output pipe 232. The paths of the second input conduit 220 and the third input 222 conduit may also be altered to pass through corresponding heat exchangers with the second and third waster output conduits and condensate output conduits, respectively.

The vapor temperature within each chamber 212, 214, and 216 is less than the temperature of the evaporator walls 264a/264/b263c and greater than the temperature of the condensation walls 270a/270b/270c, respectively. The pressure inside each of the chambers 212/214/216 is equal to the saturation pressure of the water vapor at the corresponding vapor temperature. Thus, as long as no non-condensable gases are present within a chamber, the pressure (and temperature) of the vapor in that chamber may be controlled by the temperatures of the evaporation and condensation walls.

The thermal energy released upon condensation of the vapor in chamber 212 is transferred through the wall (separating chambers 212 and 214) to the falling liquid coating on the evaporator wall of chamber 214. As a result, condensation and evaporation occur simultaneously on the opposite sides of the wall separating chambers 212 and 214 at slightly different temperatures and pressures. The saturated vapor created in chamber 214 moves to the condenser side (right hand side wall of chamber 212 in FIG. 5), where the vapor condenses due to the relatively lower temperature of the condenser wall. Additional vapor chambers can be added downstream of chamber 214 in a similar manner up to a point where the temperature of the generated vapor gets relatively close to the cooling medium, i.e. ambient air or the saline water.

The distillation system of the current disclosure comprises a chamber having an internal pressure, a top end, a bottom end, an evaporation wall having an inner surface, a condensation wall having an inner surface, the inner surface of the condensation wall facing the inner surface of the evaporation wall, an inlet positioned at the top end, a baffle to direct an aqueous fluid from the inlet to the inner surface of the evaporation wall to form a fluid coating on the inner surface of the evaporation wall, a waste collection compartment positioned at the bottom end adjacent to the evaporation wall to receive an aqueous waste fluid from the evaporation wall, and a condensate collection compartment positioned at the bottom end adjacent to the condensation wall to receive an aqueous distillate from the condensation wall, the waste collection compartment having a waste outlet, and the condensate collecting compartment having a condensate outlet; an input conduit fluidly connected to the baffle to deliver the aqueous fluid to the chamber; a pressure reducing valve connected to the input conduit and configured to cause the internal pressure of the chamber to be less than atmospheric pressure; a waste output conduit connected to the waste outlet of the waste collection compartment of the chamber; and a condensate output conduit connected to the condensate outlet of the condensate collection compartment of the chamber. The inner surface of the evaporation wall is constructed to maintain an evaporation surface temperature that is greater than a condensation surface temperature of the inner surface of the condensation wall when the aqueous fluid is delivered from the input conduit into the first chamber and the aqueous fluid forms the fluid coating which moves down the inner surface of the evaporation wall towards the waste collection compartment. A saturation pressure differential is created as water from the aqueous fluid evaporates from the inner surface of the evaporation wall and condenses on the inner surface of the condensation wall forming an aqueous condensate, which moves down the inner surface of the condensation wall and is collected as the aqueous distillate in the condensation collecting compartment.

The multiple-effect distillation system of the present disclosure comprises a first chamber comprising a first evaporation surface, a first condensation surface which faces the first evaporation surface, a first inlet positioned at a top end of the first chamber, a baffle to direct a first aqueous fluid from the inlet to the first evaporation surface to form a first fluid coating on the first evaporation surface, a first waste collection compartment positioned to receive a first aqueous waste fluid from the first evaporation surface and having a first waste outlet, and a first condensate collection compartment positioned to receive a first aqueous distillate from the first condensation surface and having a first condensate outlet; a first pressure reducing valve connected to the first chamber to reduce the internal pressure in the first chamber to be less than atmospheric pressure; a first waste output conduit connected to the first waste outlet of the first waste collection compartment of the first chamber; and a first condensate output conduit connected to the first condensate outlet of the first condensate collection compartment of the first chamber. The first evaporation surface is constructed to maintain a first evaporation surface temperature that is greater than a first condensation surface temperature of the first condensation surface when the first aqueous fluid forms the first fluid coating on the first evaporation surface. The multiple-effect distillation system also comprises at least a second chamber having a second evaporation surface, a second condensation surface which faces the second evaporation surface, a second inlet positioned at a top end of the second chamber, a baffle to direct the first aqueous waste fluid from the second inlet to the second evaporation surface to form a second fluid coating on the second evaporation surface, a second waste collection compartment positioned to receive a second aqueous waste fluid from the second evaporation surface and having a second waste outlet, and a second condensate collection compartment positioned to receive a second aqueous distillate from the second condensation surface and having a second condensate outlet, wherein the first condensation surface and the second evaporation surface comprise (1) facial surfaces of a first common wall shared by the first chamber and the second chamber, or (2) facial surfaces of separate but abutting walls of the first chamber and the second chamber, respectively; a second pressure reducing valve connected to the second chamber to reduce the internal pressure in the second chamber to be less than atmospheric pressure; a second waste output conduit connected to the second waste outlet of the second waste collection compartment; and a second condensate output conduit connected to the second condensate outlet of the second condensate collection compartment. The second evaporation surface is constructed to maintain a second evaporation surface temperature that is greater than a second condensation surface temperature of the second condensation surface when the first aqueous waste fluid forms the second fluid coating on the second evaporation surface.

The method of distilling an aqueous fluid of the present disclosure comprises (1) obtaining a multiple-effect distillation system, comprising: a first chamber comprising a first evaporation surface, a first condensation surface which faces the first evaporation surface, a first inlet positioned at a top end of the first chamber, a baffle to direct a first aqueous fluid from the inlet to the first evaporation surface to form a first fluid coating on the first evaporation surface, a first waste collection compartment positioned to receive a first aqueous waste fluid from the first evaporation surface and having a first waste outlet, and a first condensate collection compartment positioned to receive a first aqueous distillate from the first condensation surface and having a first condensate outlet, a first pressure reducing valve connected to the first chamber to reduce the internal pressure in the first chamber to be less than atmospheric pressure; a first waste output conduit connected to the first waste outlet of the first waste collection compartment of the first chamber, a first condensate output conduit connected to the first condensate outlet of the first condensate collection compartment of the first chamber; and at least a second chamber having a second evaporation surface, a second condensation surface which faces the second evaporation surface, a second inlet positioned at a top end of the second chamber, a baffle to direct the first aqueous waste fluid from the second inlet to the second evaporation surface to form a second fluid coating on the second evaporation surface, a second waste collection compartment positioned to receive a second aqueous waste fluid from the second evaporation surface and having a second waste outlet, and a second condensate collection compartment positioned to receive a second aqueous distillate from the second condensation surface and having a second condensate outlet, wherein the first condensation surface and the second evaporation surface comprise (a) facial surfaces of a first common wall shared by the first chamber and the second chamber, or (b) facial surfaces of separate but abutting walls of the first chamber and the second chamber, respectively, a second pressure reducing valve connected to the second chamber to reduce the internal pressure in the second chamber to be less than atmospheric pressure, a second waste output conduit connected to the second waste outlet of the second waste collection compartment, and a second condensate output conduit connected to the second condensate outlet of the second condensate collection compartment; (2) maintaining the first evaporation surface at a first evaporation surface temperature that is greater than a first condensation surface temperature of the first condensation surface when the first aqueous fluid is directed to the first evaporation surface forming the first aqueous distillate; (3) removing the first aqueous distillate from the first chamber; (4) transferring the first aqueous waste fluid to the second evaporation surface of the second chamber forming the second fluid coating on the second evaporation surface; (5) maintaining the second evaporation surface at a second evaporation surface temperature that is greater than a second condensation surface temperature of the second condensation surface forming the second aqueous distillate; and (6) removing the second aqueous distillate from the second chamber.

While the present disclosure has been described herein in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure as defined herein. Thus the examples described above, which include particular embodiments, will serve to illustrate the practice of the inventive concepts of the present disclosure, it being understood that the particulars shown are by way of example and for purposes of illustrative discussion of particular embodiments only and are presented in the cause of providing what is believed to be the most useful and readily understood description of procedures as well as of the principles and conceptual aspects of the present disclosure. Changes may be made in the devices, components and methods described herein, and in the steps or the sequence of steps of the methods described herein without departing from the spirit and scope of the present disclosure. Further, while various embodiments of the present disclosure have been described in claims herein below, it is not intended that the present disclosure be limited to these particular claims. Applicants reserve the right to amend, add to, or replace the claims indicated herein below in subsequent patent applications.

What is claimed is:

1. A distillation system, comprising:
a chamber having an internal pressure, a top end, a bottom end, an evaporation wall having an inner surface, a condensation wall having an inner surface, the inner surface of the condensation wall facing the inner surface of the evaporation wall, an edge wall connecting the evaporation wall to the condensation wall, the edge wall having an edge wall width, the evaporation wall having an evaporation wall width, the evaporation wall width being greater than the edge wall width, an inlet positioned above the bottom end, a baffle to direct an aqueous fluid from the inlet to the inner surface of the evaporation wall to form a fluid coating on the inner surface of the evaporation wall, a waste collection compartment positioned at the bottom end adjacent to the evaporation wall to receive an aqueous waste fluid from the evaporation wall, and a condensate collection compartment positioned at the bottom end adjacent to the condensation wall to receive an aqueous distillate from the condensation wall, the waste collection compartment having a waste outlet, and the condensate collection compartment having a condensate outlet;
an input conduit fluidly connected to the baffle to deliver the aqueous fluid to the chamber;
a pressure reducing valve connected to the input conduit and configured to cause the internal pressure of the chamber to be less than atmospheric pressure;
a waste output conduit connected to the waste outlet of the waste collection compartment of the chamber; and
a condensate output conduit connected to the condensate outlet of the condensate collection compartment of the chamber; and
wherein the inner surface of the evaporation wall is constructed to maintain an evaporation surface temperature that is greater than a condensation surface temperature of the inner surface of the condensation wall when the aqueous fluid is delivered from the input conduit into the chamber and the aqueous fluid forms the fluid coating which moves down the inner surface of the evaporation wall towards the waste collection compartment, and wherein a saturation pressure differential is created as water from the aqueous fluid evaporates from the inner surface of the evaporation wall and condenses on the inner surface of the condensation wall forming an aqueous condensate, which moves down the inner surface of the condensation wall and is collected as the aqueous distillate in the condensate collection compartment.

2. The distillation system of claim 1 further comprising a heat source for supplying heat to the evaporation wall.

3. The distillation system of claim 1 further comprising a pump positioned on the condensate output conduit for discharging the aqueous distillate from the chamber.

4. The distillation system of claim 1, wherein the evaporation wall and the condensation wall are substantially-vertically oriented.

5. The distillation system of claim 1, wherein the chamber is a first chamber, the condensation wall is a first condensation wall, the internal pressure is a first internal pressure, the top end is a first top end, the bottom end is a first bottom end, the evaporation wall is a first evaporation wall, the inlet is a first inlet, the baffle is a first baffle, the waste collection compartment is a first waste collection compartment, the aqueous waste fluid is a first aqueous waste fluid, the condensate collection compartment is a first condensate collection compartment, the aqueous distillate is a first aqueous distillate, the waste outlet is a first waste outlet, the condensate outlet is a first condensate outlet, the waste output conduit is a first waste output conduit, and wherein the distillation system further comprises:
a second chamber having a second internal pressure, a second top end, a second bottom end, a second evaporation wall positioned adjacent or integral to the first condensation wall of the first chamber and having an inner surface, a second condensation wall facing the second evaporation wall and having an inner surface, a second inlet positioned above the second bottom end, a second baffle to direct the first aqueous waste fluid from the second inlet to the inner surface of the second evaporation wall, a second waste collection compartment positioned at the second bottom end adjacent to the second evaporation wall to receive a second aqueous waste fluid from the second evaporation wall, and a second condensate collection compartment positioned at the second bottom end adjacent to the second condensate wall to receive a second aqueous distillate from the second condensation wall, the second waste collection compartment having a second waste outlet, and the second condensate condensation collection compartment having a second condensate outlet,
a transfer conduit extending from the first waste output conduit of the first chamber and in fluid connection with the second inlet of the second chamber for conveying the first aqueous waste fluid from the first waste collection compartment of the first chamber to the second chamber, and
a valve positioned on the transfer conduit for controlling the pressure of the first aqueous waste fluid being conveyed into the second chamber,
wherein the inner surface of the second evaporation wall is constructed to maintain a second evaporation surface temperature that is greater than a second condensation surface temperature of the inner surface of the second condensation wall when the first aqueous waste fluid is delivered via the transfer conduit to the second chamber and wherein as the first aqueous waste fluid moves down the inner surface of the second evaporation wall towards the second waste collection compartment, water from the first aqueous waste fluid evaporates from the inner surface of the second evaporation wall and condenses on the inner surface of the second condensation wall forming a second aqueous condensate, which moves down the inner surface of the second condensation wall and is collected as the second aqueous distillate in the second condensate collection compartment,
and wherein the second internal pressure of the second chamber is less than the first internal pressure of the first chamber such that a second temperature of the inner surface of the second evaporation wall is less than a first temperature of the inner surface of the first evaporation wall.

6. The distillation system of claim 5, further comprising a heat source for supplying heat to the second evaporation wall.

7. The distillation system of claim 5, further comprising a heat exchanger located between the first waste outlet of the first chamber and the second inlet for reducing the temperature of the first aqueous waste fluid delivered to the second chamber.

8. The distillation system of claim 5, further comprising a second pump positioned on the second condensate outlet for discharging the second aqueous distillate from the second chamber.

9. The distillation system of claim 1, wherein the chamber is a first chamber, the condensation wall is a first condensation wall, the internal pressure is a first internal pressure, the top end is a first top end, the bottom end is a first bottom end, the evaporation wall is a first evaporation wall, the inlet is a first inlet, the baffle is a first baffle, the waste collection compartment is a first waste collection compartment, the aqueous waste fluid is a first aqueous waste fluid, the condensate collection compartment is a first condensate collection compartment, the aqueous distillate is a first aqueous distillate, the waste outlet is a first waste outlet, the condensate outlet is a first condensate outlet and wherein the distillation system further comprises:
 a second chamber having a second internal pressure, a second top end, a second bottom end, a second evaporation wall positioned adjacent or integral to the first condensation wall of the first chamber and having an inner surface, a second condensation wall facing the second evaporation wall and having an inner surface, a second inlet positioned above the second bottom end, a second baffle to direct the first aqueous waste fluid from the second inlet to the inner surface of the second evaporation wall, a second waste collection compartment positioned at the second bottom end adjacent to the second evaporation wall to receive a second aqueous waste fluid from the second evaporation wall, and a second condensate collection compartment positioned at the second bottom end adjacent to the second condensate wall to receive a second aqueous distillate from the second condensation wall, the second waste collection compartment having a second waste outlet, and the second condensate collection compartment having a second condensate outlet;
a second input conduit fluidly connected to the second baffle to deliver the second aqueous fluid to the second chamber;
a second pressure reducing valve connected to the second input conduit and configured to cause the second internal pressure of the second chamber to be less than atmospheric pressure,
a second waste output conduit connected to the second waste outlet of the second waste collection compartment of the second chamber; and
a second condensate output conduit connected to the second condensate outlet of the second condensate collection compartment of the second chamber,
wherein the inner surface of the second evaporation wall is constructed to maintain a second evaporation surface temperature that is greater than a second condensation surface temperature of the inner surface of the second condensation wall when the first aqueous waste fluid is delivered to the second chamber and wherein as the first aqueous waste fluid moves down the inner surface of the second evaporation wall towards the second waste collection compartment, water from the first aqueous waste fluid evaporates from the inner surface of the second evaporation wall and condenses on the inner surface of the second condensation wall forming a second aqueous condensate, which moves down the inner surface of the second condensation wall and is collected as the second aqueous distillate in the second condensate collection compartment,
and wherein the second internal pressure of the second chamber is less than the first internal pressure of the first chamber such that a second temperature of the inner surface of the second evaporation wall is less than a first temperature of the inner surface of the first evaporation wall.

10. A multiple-effect distillation system, comprising:
a first chamber comprising a first evaporation wall having a first evaporation surface, a first condensation wall having a first condensation surface which faces the first evaporation surface, an edge wall connecting the evaporation wall to the condensation wall, the edge wall having an edge wall width, the evaporation wall having an evaporation wall width, the evaporation wall width being greater than the edge wall width, a first inlet positioned at a top end of the first chamber, a first baffle to direct a first aqueous fluid from the first inlet to the first evaporation surface to form a first fluid coating on the first evaporation surface, a first waste collection compartment positioned to receive a first aqueous waste fluid from the first evaporation surface and having a first waste outlet, and a first condensate collection compartment positioned to receive a first aqueous distillate from the first condensation surface and having a first condensate outlet;

a first pressure reducing valve connected to the first chamber to reduce a first internal pressure in the first chamber to be less than atmospheric pressure;

a first waste output conduit connected to the first waste outlet of the first waste collection compartment of the first chamber; and a first condensate output conduit connected to the first condensate outlet of the first condensate collection compartment of the first chamber;

wherein the first evaporation surface is constructed to maintain a first evaporation surface temperature that is greater than a first condensation surface temperature of the first condensation surface when the first aqueous fluid forms the first fluid coating on the first evaporation surface;

at least a second chamber having a second evaporation surface, a second condensation surface which faces the second evaporation surface, a second inlet positioned above a bottom end of the second chamber, a second baffle to direct the first aqueous waste fluid from the second inlet to the second evaporation surface to form a second fluid coating on the second evaporation surface, a second waste collection compartment positioned to receive a second aqueous waste fluid from the second evaporation surface and having a second waste outlet, and a second condensate collection compartment positioned to receive a second aqueous distillate from the second condensation surface and having a second condensate outlet, wherein the first condensation surface and the second evaporation surface comprise (1) facial surfaces of a first common wall shared by the first chamber and the second chamber, or (2) facial surfaces of separate but abutting walls of the first chamber and the second chamber, respectively;

a second pressure reducing valve connected to the second chamber to reduce a second internal pressure in the second chamber to be less than atmospheric pressure;

a second waste output conduit connected to the second waste outlet of the second waste collection compartment;

a second condensate output conduit connected to the second condensate outlet of the second condensate collection compartment; and wherein the second evaporation surface is constructed to maintain a second evaporation surface temperature that is greater than a second condensation surface temperature of the second condensation surface when the first aqueous waste fluid forms the second fluid coating on the second evaporation surface.

11. The multiple-effect distillation system of claim 10 further comprising a first heat source for supplying heat to the first evaporation surface.

12. The multiple-effect distillation system of claim 10 further comprising a second heat source for supplying heat to the second evaporation surface.

13. The multiple-effect distillation system of claim 10 further comprising a first pump positioned on the first condensate output conduit for discharging the first aqueous distillate from the first chamber.

14. The multiple-effect distillation system of claim 10 further comprising a second pump positioned on the second condensate output conduit for discharging the second aqueous distillate from the second chamber.

15. The multiple-effect distillation system of claim 10, wherein the first chamber and the second chamber are substantially-vertically oriented.

16. The multiple-effect distillation system of claim 10, further comprising a heat exchanger for transferring heat energy from the first aqueous waste fluid leaving the first chamber to fresh aqueous fluid being delivered to the first chamber.

17. The multiple-effect distillation system of claim 10, further comprising a third chamber having a third evaporation surface, a third condensation surface which faces the third evaporation surface, a third inlet positioned above a third bottom end of the third chamber, a third baffle to direct the second aqueous waste fluid from the third inlet to the third evaporation surface to form a third fluid coating on the third evaporation surface, a third waste collection compartment positioned to receive a third aqueous waste fluid from the third evaporation surface and having a third waste outlet, and a third condensate collection compartment positioned to receive a third aqueous distillate from the third condensation surface and having a third condensate outlet, wherein the second condensation surface and the third evaporation surface comprise (1) facial surfaces of a second common wall shared by the second chamber and the third chamber, or (2) facial surfaces of separate but abutting walls of the second chamber and the third chamber, respectively.

18. The multiple-effect distillation system of claim 17, further comprising a fourth chamber having a fourth evaporation surface, a fourth condensation surface which faces the fourth evaporation surface, a fourth inlet positioned above a fourth bottom end of the fourth chamber, a fourth baffle to direct the third aqueous waste fluid from the fourth inlet to the fourth evaporation surface to form a fourth fluid coating on the fourth evaporation surface, a fourth waste collection compartment positioned to receive a fourth aqueous waste fluid from the fourth evaporation surface and having a fourth waste outlet, and a fourth condensate collection compartment positioned to receive a fourth aqueous distillate from the fourth condensation surface and having a fourth condensate outlet, wherein the third condensation surface and the fourth evaporation surface comprise (1) facial surfaces of a third common wall shared by the third chamber and the fourth chamber, or (2) facial surfaces of separate but abutting walls of the third chamber and the fourth chamber, respectively.

19. A method of distilling an aqueous fluid, comprising:

obtaining a multiple-effect distillation system, comprising:

a first chamber comprising a first evaporation wall having a first evaporation surface, a first condensation wall having a first condensation surface which faces the first evaporation surface, an edge wall connecting the evaporation wall to the condensation wall, the edge wall having an edge wall width, the evaporation wall having an evaporation wall width, the evaporation wall width being greater than the edge wall width, a first inlet positioned above a first bottom end of the first chamber, a first baffle to direct a first aqueous fluid from the first inlet to the first evaporation surface to form a first fluid coating on the first evaporation surface, a first waste collection compartment positioned to receive a first aqueous waste fluid from the first evaporation surface and having a first waste outlet, and a first condensate collection compartment positioned to receive a first aqueous distillate from the first condensation surface and having a first condensate outlet, a first pressure reducing valve connected to the first chamber to reduce an internal pressure in the first chamber to be less than atmospheric pressure, a first waste output conduit connected to the first waste outlet of the first waste collection compartment of the first chamber, a first condensate output conduit connected to the first condensate outlet of the first condensate collection compartment of the first chamber, and at least a second chamber having a second evaporation surface, a second condensation surface which faces the second evaporation surface, a second inlet positioned above a second bottom end of the second chamber, a second baffle to direct the first aqueous waste fluid from the second inlet to the second evaporation surface to form a second fluid coating on the second evaporation surface, a second waste collection compartment positioned to receive a second aqueous waste fluid from the second evaporation surface and having a second waste outlet, and a second condensate collection compartment positioned to receive a second aqueous distillate from the second condensation surface and having a second condensate outlet, wherein the first condensation surface and the second evaporation surface comprise (1) facial surfaces of a first common wall shared by the first chamber and the second chamber, or (2) facial surfaces of separate but abutting walls of the first chamber and the second chamber, respectively, a second pressure reducing valve connected to the second chamber to reduce the internal pressure in the second chamber to be less than atmospheric pressure, a second waste output conduit connected to the second waste outlet of the second waste collection compartment, and a second condensate output conduit connected to the second condensate outlet of the second condensate collection compartment; and maintaining the first evaporation surface at a first evaporation surface temperature that is greater than a first condensation surface temperature of the first condensation surface when the first aqueous fluid is directed to the first evaporation surface forming the first aqueous distillate;

removing the first aqueous distillate from the first chamber;

transferring the first aqueous waste fluid to the second evaporation surface of the second chamber forming the second fluid coating on the second evaporation surface;

maintaining the second evaporation surface at a second evaporation surface temperature that is greater than a second condensation surface temperature of the second condensation surface forming the second aqueous distillate; and removing the second aqueous distillate from the second chamber.

20. The method of claim 19, comprising heating the first evaporation surface and the second evaporation surface with a separate heat source.

21. The method of claim 19, wherein the multiple-effect distillation system further comprises a third chamber having a third evaporation surface and a third condensation surface which faces the third evaporation surface, and further comprising the steps of:

transferring the second aqueous waste fluid to the third evaporation surface of the third chamber forming a third fluid coating on the third evaporation surface;

maintaining the third evaporation surface at a third evaporation surface temperature that is greater than a third condensation surface temperature of the third condensation surface forming a third aqueous distillate and a third aqueous waste fluid; and removing the third aqueous distillate from the third chamber.

22. The method of claim 21, wherein the multiple-effect distillation system further comprises a fourth chamber having a fourth evaporation surface and a fourth condensation surface which faces the fourth evaporation surface, and further comprising the steps of:

transferring the third aqueous waste fluid to the fourth evaporation surface of the fourth chamber forming a fourth fluid coating on the fourth evaporation surface;

maintaining the fourth evaporation surface at a fourth evaporation surface temperature that is greater than a fourth condensation surface temperature of the fourth condensation surface forming a fourth aqueous distillate and a fourth aqueous waste fluid; and removing the fourth aqueous distillate from the fourth chamber.

* * * * *

UNITED STATES PATENT AND TRADEMARK OFFICE
CERTIFICATE OF CORRECTION

PATENT NO. : 10,702,794 B2
APPLICATION NO. : 16/175352
DATED : July 7, 2020
INVENTOR(S) : Hamidreza Shabgard and Kumar Parthasarathy Page 1 of 1

It is certified that error appears in the above-identified patent and that said Letters Patent is hereby corrected as shown below:

In the Claims

Column 25, Line 1: Delete "condensation".

Signed and Sealed this
Eighteenth Day of August, 2020

Andrei Iancu
*Director of the United States Patent and Trademark Office*